Aug. 5, 1941.   C. A. NERACHER ET AL   2,251,464
POWER TRANSMISSION
Filed May 13, 1938   6 Sheets-Sheet 1
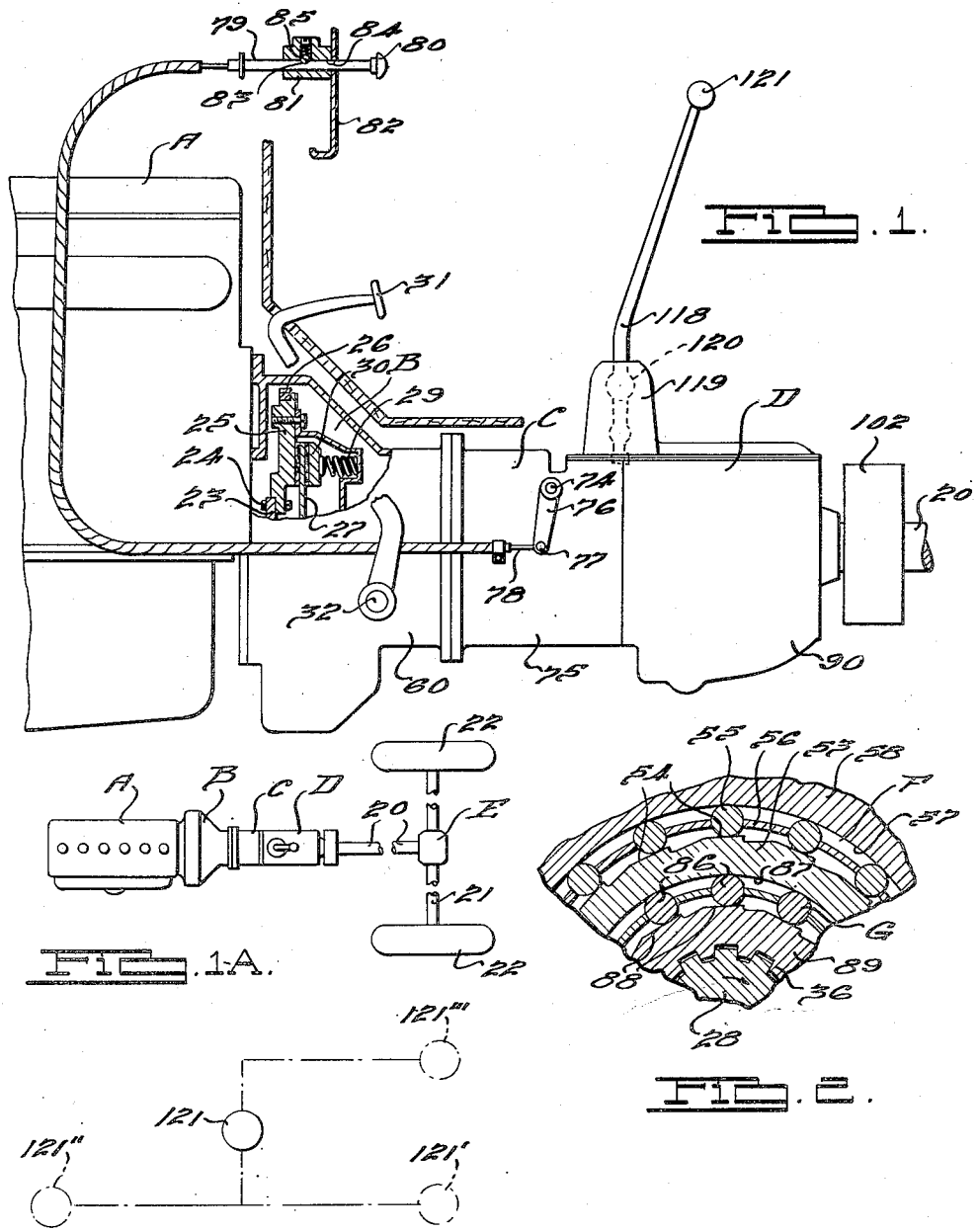
INVENTORS.
Carl A. Neracher,
BY William T. Dunn.
Harness, Dick, Pates & Harris
ATTORNEYS.

Aug. 5, 1941.   C. A. NERACHER ET AL   2,251,464
POWER TRANSMISSION
Filed May 13, 1938   6 Sheets-Sheet 2
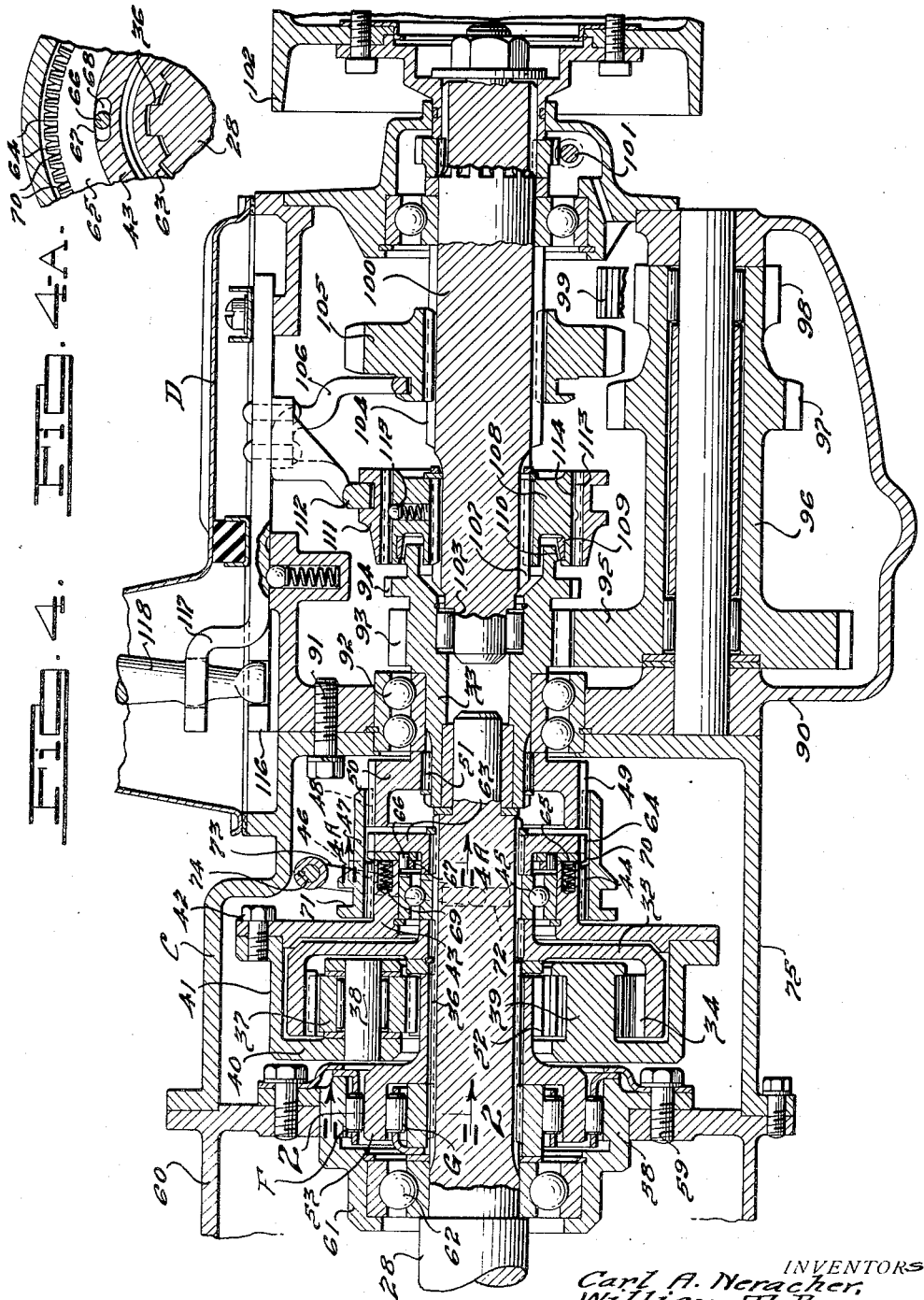
INVENTORS.
Carl A. Neracher,
William T. Dunn.
BY
Harness, Dind, Patee & Harris
ATTORNEYS.

Aug. 5, 1941.  C. A. NERACHER ET AL  2,251,464
POWER TRANSMISSION
Filed May 13, 1938  6 Sheets-Sheet 3
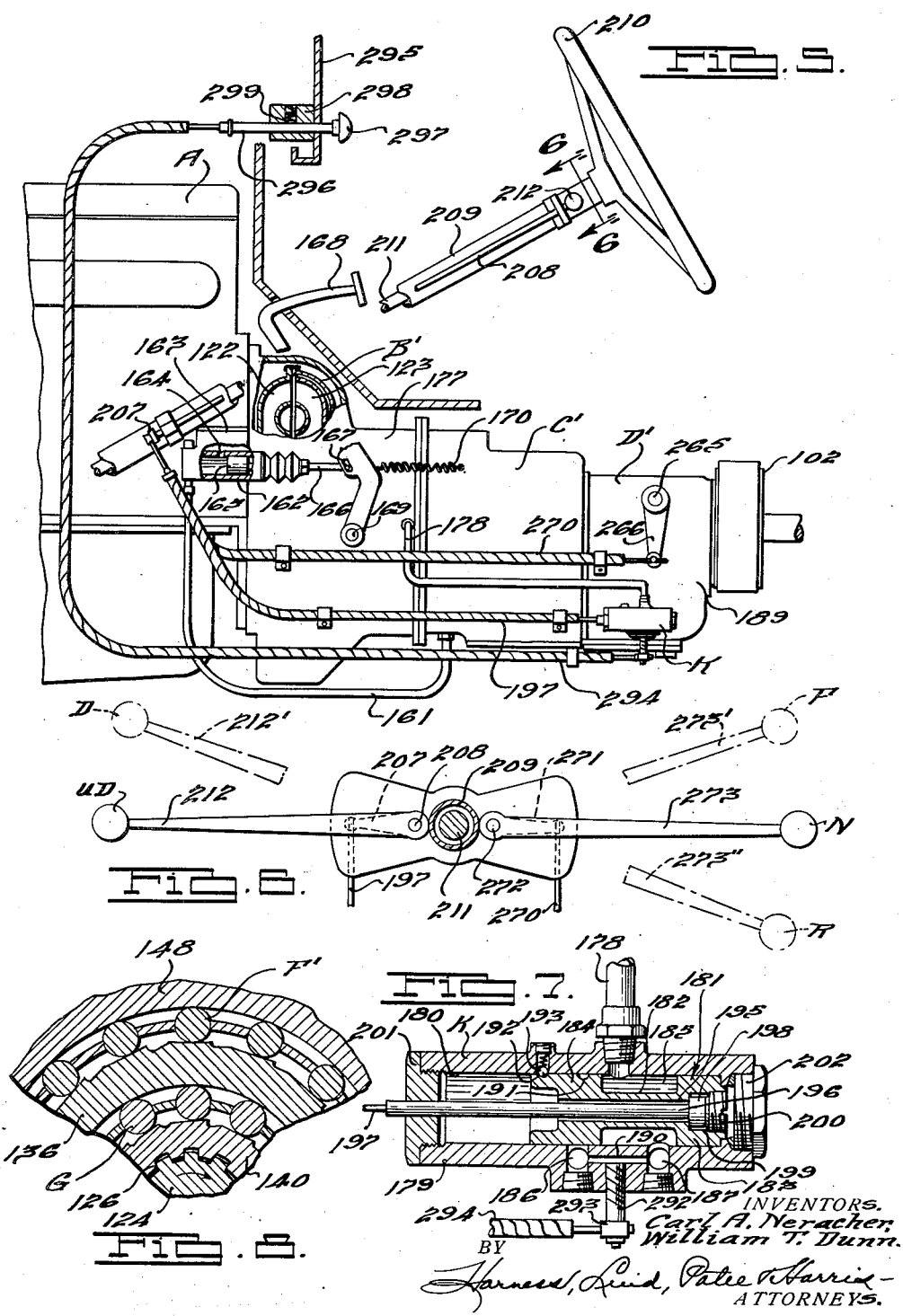

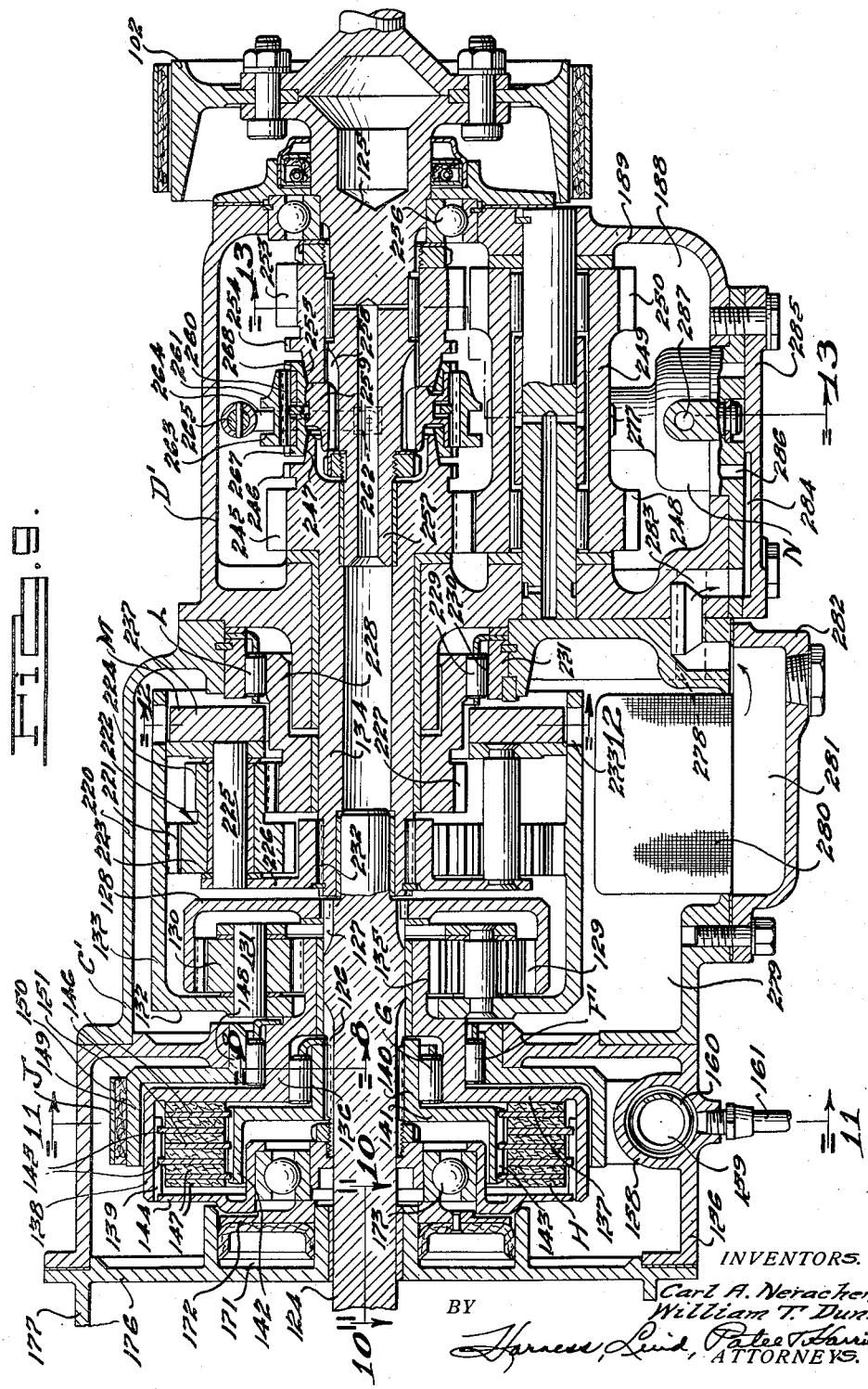

Aug. 5, 1941.  C. A. NERACHER ET AL  2,251,464
POWER TRANSMISSION
Filed May 13, 1938  6 Sheets-Sheet 5

INVENTORS.
Carl A. Neracher,
BY William T. Dunn.
ATTORNEYS.

Patented Aug. 5, 1941

2,251,464

UNITED STATES PATENT OFFICE 2,251,464

POWER TRANSMISSION

Carl A. Neracher and William T. Dunn, Detroit, Mich., assignors to Chrysler Corporation, Highland Park, Mich., a corporation of Delaware Application May 13, 1938, Serial No. 207,713

36 Claims. (Cl. 74—262)

This invention relates to power transmission of the type especially adapted for transmitting power for driving a motor vehicle.

One object of our invention is to provide an improved system of motor vehicle drive control embodying more desirable flexibility of speed ratio changing, improved ease of operation, better economy of driving; also many features of vehicle drive control which adapt themselves to driving conditions at any time.

Heretofore it has been customary in many motor vehicle transmission systems to employ a change speed transmission of general standard type, giving three forward speed ratios including direct and a reverse drive, together with an overdriving mechanism behind the standard transmission so that the drive passes first through the standard transmission and then to the overdrive mechanism. In such systems the usual relatively slow speed axle ratio of about 4.3 is customarily used. This well known overdrive mechanism provides an overrunning direct drive which is releasable, on release of the accelerator pedal to slow down the engine and the attainment of a predetermined vehicle speed such as forty miles per hour, to automatically engage a centrifugal clutch to effect an overdrive through a planetary gear set. When the vehicle speed in overdrive drops down to a predetermined speed at which the overdrive control clutch will automatically release, generally around 25 miles per hour, the drive is then automatically resumed in direct. This known arrangement is advantageous in slowing down the engine less than a direct drive to the usual propeller shaft with resulting fuel economy, reduction in engine wear, quieter operation of mechanical parts and other known advantages.

With the foregoing known overdrive arrangement, there is lacking a desired flexibility of drive control in that the overdrive is effective only on attaining a predetermined vehicle speed and once engaged cannot be released until the car speed has dropped as aforesaid. Such arrangement prevents the realization of overdrive economy for city driving which is ordinarily 75% of average driving conditions. There is also the disadvantage in that, when in overdrive, the unfavorable speed ratio drive prevents rapid car acceleration as is frequently desirable in passing another car or where for other reasons the engine is called on to suddenly deliver greater torque or to rapidly accelerate the car. If the overdrive cut-in speed were reduced to, say 20 miles per hour, to enable more economical running in the city then the resulting unfavorable speed ratio would give sluggish performance for rapid acceleration in traffic conditions.

Further disadvanges of the aforesaid conventional overdrive mechanism are that a very sturdy gearing is required because it is behind the standard type transmission wherein torque can be multiplied; also the requirement for mechanism to render the direct drive overrunning clutch inoperative to enable driving the vehicle in reverse.

Our present transmission system overcomes the disadvantages of the aforesaid known type of overdrive mechanism and offers many advantages of structure, drive functions, and economy not heretofore possible.

We preferably employ certain fundamental arrangements of parts such as the use of an underdrive or reduction drive mechanism ahead of a change speed transmission of conventional or other type, together with a relatively fast axle ratio in the neighborhood of 3.5 by way of example.

While the underdrive mechanism may have any desired number of speed ratio drives or changes, we preferably provide an arrangement whereby the drive through this mechanism is either direct viz., a speed ratio of 1 to 1, or an underdrive viz., a speed reduction less than 1 to 1. More particularly our underdrive mechanism is preferably so arranged that during normal car running the drive therethrough is a direct drive although the underdrive is obtained at will and during initial acceleration of the car from standstill thereby obtaining the advantage of more powerful and faster car acceleration. Thus the effect of a normal direct drive, in conjunction with the relatively fast axle and a setting of direct drive in the change speed transmission behind the underdrive mechanism, is substantially the equivalent of obtaining an overdrive from the engine to the car driving ground wheels.

The direct drive offers advantages of quiet running and high economy for city as well as country driving conditions, our control system being such that the underdrive may be immediately brought into action at any time without shock or jolt to the passengers or the parts of the driving mechanisms. Furthermore, the underdrive mechanism is operable at will from the underdrive to the faster drive, such as direct, without shock or jolt.

We have provided an underdrive mechanism which employs gearing of the planetary type for obtaining the underdrive ratio since this general type of gearing offers many advantages of quietness of operation, compactness, and unique ability of control. During the direct drive the gearing is locked-up so that it turns as a unit with the driving and driven shafts of the underdriving mechanism.

We have provided drive control means, such as a direct drive clutch, to effect the change from underdrive to direct drive through the underdrive mechanism. In one embodiment of our invention this direct drive clutch is adapted for actuation by the vehicle driver while in another embodiment this clutch is operated automatically in response to the attainment of a predetermined desired speed of the vehicle or a part whose speed is proportionate to car speed. In this latter embodiment we have illustrated a compound gearing for the underdrive ratio with an automatically operating means for stepping-up the reduction drive either prior to or after operation of the automatically operating direct drive clutch. If desired the step-up gearing may be omitted so that the gearing will then correspond to our principal or first embodiment.

We may employ a fluid coupling for providing a drive connection between the engine and the underdrive mechanism although our power transmission as a whole may be used in conjunction with other forms of clutches such as the ordinary plate-type friction clutch for releasing the drive between the engine and underdrive mechanism.

A fluid coupling is however, from several considerations preferred since, among its advantages are long life without wear since the circulating fluid provides the drive connection; inherent slip which accommodates the use of a relatively fast axle to great advantage since the engine can rapidly accelerate up to its maximum torque ahead of the parts driven therefrom, thereby increasing what is known as car performance or accelerating ability; smooth car get-away largely because at lower speeds the cushioning effect of the coupling is highest; elimination of rattle and backlash noises through the whole car driving mechanism and making highly accurate fits of parts less necessary since the engine torque impulses are not transferred back to the driven parts owing to the drive taking place through a liquid medium; reduction in the necessity for shifting gears or manipulating speed changes to the usual degree in the change speed transmission because of the slip characteristics of the coupling; elimination of wear as in the facings of conventional friction clutches; prevention of damage to driven parts of the car mechanism making it possible to use lighter and cheaper structures because of the softness of the fluid clutch action making abuse of the parts impossible; provision for safer and easier driving on slippery pavement because of the gentle acceleration and retardation characteristics; provision for safety feature if the engine should stall on a hill since the engine may be started without the driver declutching or removing his foot from the brake pedal; making unnecessary the driver holding his foot on the usual clutch pedal while the car is stopped in traffic; and providing for increased car performance without enlarging engines thereby offering lower weight and cost together with increased oil and fuel economy, and increased engine life.

Our underdrive mechanism provides reduction gearing, preferably of the planetary type, having drive control means normally operating to effect the underdrive but releasing either at the will of the driver or automatically in response to operation of the direct drive. Of especial advantage where a fluid coupling is employed, the underdrive control means is rendered ineffective for a release of the underdrive at the will of the driver. This provides for release of the underdrive so as to disconnect the fluid coupling from the transmission mechanism rearwardly thereof, thereby to facilitate selective manipulation of the transmission mechanism especially in starting the car from standstill.

The direct drive of the underdrive mechanism according to one embodiment of our invention likewise has control means therefor, preferably in the form of the aforesaid direct drive clutch, normally operating when the car is running but automatically releasing when the car is standing still. We also make provision for automatic operation of this control means in response to car acceleration in the underdrive to effect an automatic step-up in the drive. Thus to initially accelerate the car it is only desirable to effect release of the underdrive control means to release the drag effect through the fluid coupling in order to manipulate the selectively operable transmission while selective operation during normal car running, where a plurality of forward speeds are employed in the selectively operable transmission, requires only release of the direct drive control means because of the releasable characteristic of the underdrive. In the operating system embodying a fluid coupling, we preferably provide a driver operated control element such as a foot pedal for example and means operated thereby to effect release of the control means for the underdrive. Thus, under any conditions of car drive or at standstill, the drive through the underdrive mechanism may be released even though the engine is running fast enough to operate the driving shaft of the underdrive mechanism by virtue of the fluid medium circulated in the fluid coupling.

In the event that the fluid coupling is dispensed with, a conventional friction plate-type clutch may be employed in which case it is not necessary to use a driver release means for the underdrive control means. When the driver release means is employed, the underdrive mechanism may, if desired, be connected directly to the engine as will be more apparent hereinafter.

We also employ a novel control system whereby the direct drive of the underdrive mechanism may be released at the will of the driver to enable sustained underdrive without the direct drive coming into action, this overall drive thus preventing automatic operation of the step-up drive.

We have provided a novel underdrive mechanism wherein one of the elements of the planetary gearing constitutes a drive control element in conjunction with the underdrive control means. This control element is adapted, when held, to take reaction of the underdrive. By providing the control means with an overrunning device between the reaction-taking element and a holding means therefor, the underdrive will be made to automatically function, while releasing in response to the faster or direct drive. The overrunning device thus is part of the underdrive while overrunning during the faster or direct drive. Furthermore by providing means to release the holding means the overrunning device may be rendered ineffective to hold the control element for taking reaction and thus the underdrive may be released. This releasable holding means is, as aforesaid, of especial significance in systems employing a fluid coupling or where no main clutch is used. The releasable holding means, in conjunction at times with the direct drive control means, functions as the release means between the engine and change speed transmission.

The direct drive clutch is, in one embodiment, arranged to engage automatically in response to predetermined car speed and, by preference, pressure fluid is utilized to engage the direct clutch, the supply of pressure fluid to operate the clutch being controlled by valving means under control of the vehicle driver. A further feature of our invention resides in the provision of novel means for controlling the length of time of car acceleration in underdrive before automatic engagement of the direct drive clutch takes place.

Another feature resides in the provision of an improved change speed transmission and manipulative control therefor. This transmission is preferably arranged to take the drive from the planetary gear underdrive mechanism for selectively obtaining a plurality of forwardly driving speed ratios and reverse drive from the driven shaft of the planetary mechanism to the output or tailshaft leading from the change speed transmission. By virtue of the novel characteristics of our underdrive mechanism, the change speed transmission when employed in the power transmission as a whole, preferably provides for a low or speed reduction and a faster drive preferably direct. Such an arrangement employed in conjunction with our underdrive mechanism provides for improved flexibility of vehicle drive control and an advantageous combination of speed ratio drives since, in effect, four forward speed ratios are obtainable together with a reverse which does not require shift control of the overrunning device of the underdrive control means since, by preference, only forward speeds are transmitted through the underdrive mechanism to the change speed transmission. In another embodiment of our invention the change speed transmission has only reverse and direct, the underdrive mechanism having a step-up induction drive thereby affording two reduction speed ratios and direct.

Further objects and advantages of our invention reside in the novel combination and arrangement of parts more particularly hereinafter described and claimed, reference being had to the accompanying drawings illustrative of several embodiments of our invention, in which:

Fig. 1 is a side elevational view of our power transmission with parts broken away to illustrate the main clutch.

Fig. 1A is a diagrammatic plan view of the vehicle power transmission arranged to drive the vehicle rear ground wheels.

Fig. 2 is a fragmentary sectional elevational view taken as indicated by lines 2—2 of Fig. 4.

Fig. 3 is a diagrammatic view in plan illustrating the shift path of the selector lever for manipulating the change speed transmission.

Fig. 4 is a sectional elevational view through the underdrive mechanism and change speed transmission.

Fig. 4A is a fragmentary sectional elevational view taken as indicated by line 4A—4A of Fig. 4.

Fig. 5 is a view generally corresponding to Fig. 1 but illustrating a somewhat modified arrangement of power transmission and controls, this system illustrating a fluid coupling.

Fig. 6 is a sectional plan view of the remote control mechanism taken as indicated by line 6—6 of Fig. 5.

Fig. 7 is a sectional elevational view of the valving means and associated control mechanism as seen in Fig. 5.

Fig. 8 is a fragmentary sectional elevational view taken as indicated by line 8—8 of Fig. 9.

Fig. 9 is a sectional elevational view of the underdrive mechanism and transmission of the Fig. 5 embodiment.

Figures 10, 11:
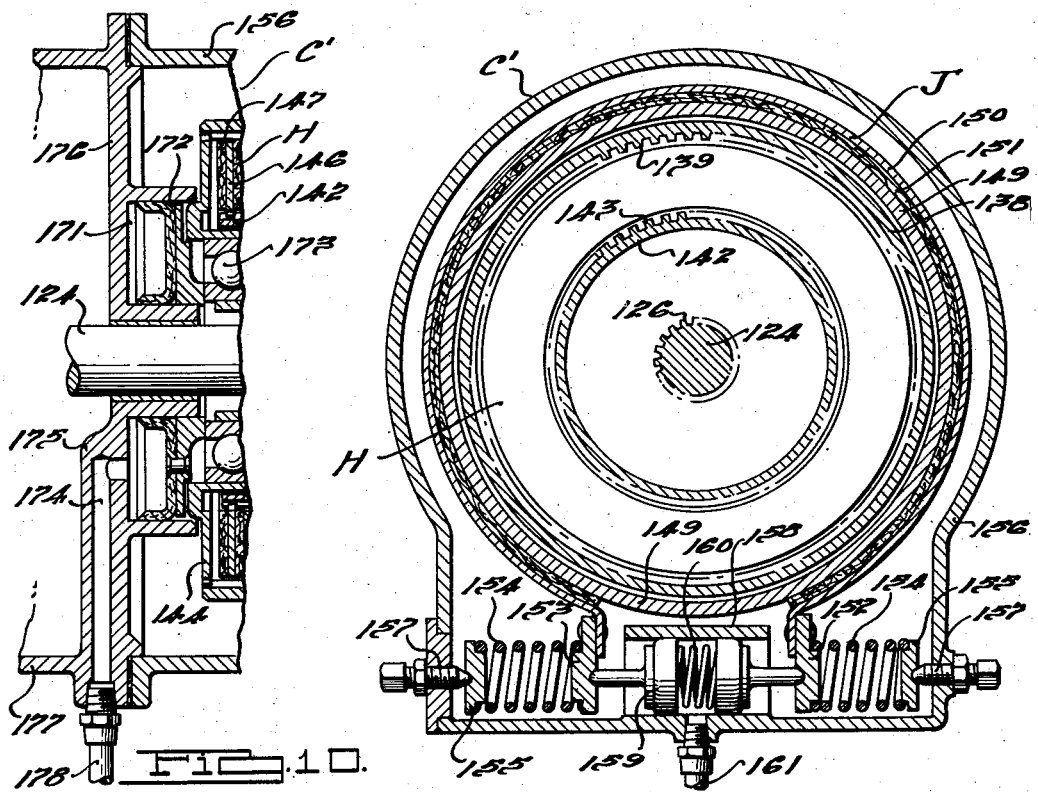
Fig. 10 is a sectional plan view taken as illustrated by the line 10—10 of Fig. 9.
Fig. 11 is a sectional elevational view illustrating the braking control means for the overrunning device, the view being taken as indicated by line 11—11 of Fig. 9.

Referring to the drawings we have elected to illustrate the principles of our invention in connection with power transmission for a motor vehicle although we desire to point out that many of the features of our invention are capable of use to advantage in other forms of devices. In connection with the adaptation of our invention as a motor vehicle power transmission, we have illustrated in Fig. 1A, in diagrammatic form, a typical arrangement of the principal illustrated portions of our power transmission wherein reference character A represents the motor vehicle prime mover which is preferably in the form of the well known internal combustion engine, the drive passing from the engine through a clutch which, in Fig. 1 is a conventional friction clutch B, to the speed ratio changing means herein illustrated as comprising a forward mechanism C and a rearward mechanism D from which the drive may pass, for the usual type of rear drive, by way of a conventional propeller shaft 20, thence through the differential E to drive the rear axle portions 21 which have the usual drive connection to the rear vehicle ground wheels 22.

As will be presently more apparent, a fluid coupling may, if desired, be substituted in place of the clutch B or the drive may pass directly from engine A to the speed ratio changing mechanism; also, the mechanisms C and D may be disposed in a single casing and in many instances it may be preferred to omit at least the forwardly driving speed ratios of the mechanism D inasmuch as the mechanism C will, by itself, provide for improved flexibility of forwardly driving speed ratio changes. We also desire to point out that our references to parts "rearwardly" or "forwardly" are terms employed in their relative sense and are used for convenience of reference in referring to the illustrated embodiments of our invention.

The engine A has the usual crankshaft, a portion of which is illustrated at 23 in Fig. 1, this crankshaft comprising the primary driving shaft of the power transmission. Secured to the crankshaft as by fasteners 24 is the flywheel 25 having the usual starter ring gear 26, the flywheel comprising the driving member for clutch B which has the usual driven friction disk assembly 27 fixed to the secondary driving shaft 28 (Fig. 4) for delivering forward drive to the underdrive mechanism C. The disk 27 is normally frictionally engaged by the usual loading springs 29 and pressure plate 30 and is disengaged by a clutch pedal 31 pivotally supported at 32 and operating in the conventional well known manner (not shown) to release clutch B.

The rear end of driving shaft 28 is piloted within the forward end of the driven shaft 33, the latter being the shaft which transmits the drive from the driving shaft 28 to the rearwardly disposed portion or change speed transmission D of the power transmission. This shaft 33 is therefore in the nature of an intermediate shaft and becomes the driving shaft for the transmission D.

For convenience of reference we will refer, unless otherwise noted, to "forward" rotation as being the rotation corresponding to that of the crankshaft 23 which has the usual clockwise rotation viewed from front to rear, this being the direction of rotation of shafts 28 and 33 when transmitting the drive to the mechanism D wherein we have located means for reversing the normal direction of drive in order to operate the vehicle in reverse.

The mechanism C preferably comprises a speed ratio changing mechanism employing planetary gearing and more particularly this mechanism is arranged to provide selectively operating forward drives, one of which is a reduction or underdrive and the other of which provides a relatively faster drive of the driven shaft 33 with respect to the driving shaft 28. This relatively faster drive is arranged to provide a direct drive wherein the speed ratio is 1 to 1.

Drivingly carried by the driving shaft 28 so as to rotate in unison therewith, we have provided the forwardly rotating input annulus gear 34 of the planetary underdrive gearing, this annulus gear being formed with an inwardly extending spider or hub structure 35 engaging the splines 36 of the driving shaft. Meshing with the annulus gear there are a plurality of planet gears or pinions, one of which is illustrated at 37 in Fig. 4, each planet gear being rotatably journalled on an axle or shaft 38 supported by the carrier structure 39.

The carrier 39 has its forward portion 40 provided with the rearwardly extending cylinder 41 which is preferably arranged for continuous driving connection with driven shaft 33 and in the present embodiment of our invention this driving connection is arranged for a continuous direct drive connection with driven shaft 33. The carrier cylinder 41 is secured by fasteners 42 with a hub 43 formed with the external longitudinally extending splines 44, the hub 43 and therefore the carrier 39 being rotatably journalled by a bearing 45 on the driving shaft 28.

Continuously engaging splines 44 are the clutching teeth 46 of the shiftable clutching device 47. This device is formed with a rear extension carrying a second set of internal clutching teeth 48 continuously meshing with the corresponding teeth or splines 49 of the hub 50 having splined engagement 51 with the driven shaft 33. The continuous direct drive connection between carrier 39 and driven shaft 33 is therefore provided by the clutch device 47.

Planet gears 37 mesh with a hollow sun gear 52 through which the driving shaft 28 freely extends for rotation relative to the sun gear, the latter having a forwardly extending cylindrical control portion 53 adapted to be acted on by a releasable holding or braking means F. This releasable holding means is preferably in the form of an overrunning control device so constructed and arranged that backward rotation of sun gear 52 is prevented while freely permitting forward rotation of the sun gear in the direction of the forward rotation of the driving shaft 28. Thus the cylinder 53 is externally formed with a plurality of camming surfaces 54 engaged by the overrunning rollers 55 spaced by a cage 56 in accordance with generally similar structures known as overrunning clutches. The rollers 55 also engage the internally formed cylindrical surface 57 of the cylindner 58 fixed by fasteners 59 to the fixed housing 60 of the clutch B. The cylinder 58 may have a forward extension 61 accommodating the bearing 62 for rotatably journalling the driving shaft 28.

As thus far described, it will be apparent that when the driving shaft 28 rotates forwardly the annulus gear 34 will likewise have forward rotation at the same speed and when the driven shaft 33 is subjected to a load, as when this shaft is drivingly connected with the ground wheels 22 of the vehicle, the carrier 39 will tend to resist rotation thereby causing the planet gears 37 to rotate on the axles 38 for urging backward rotation of sun gear 52. As soon as this sun gear tends to rotate backwards, the rollers 55 are wedged between cams 54 and cylinder 57 thereby holding sun gear 52 and forcing carrier 39 to rotate forwardly at an underdrive or reduction speed relative to the rotation of driving shaft 28. This underdrive is directly transmitted through the clutch device 47 when positioned as in Fig. 4, to transmit a corresponding underdrive to driven shaft 33.

By stepping up the drive to the driving shaft 33, as by locking the planetary gearing to rotate forwardly as a unit with driving shaft 28, the sun gear 52 is automatically released for forward or clockwise rotation, as viewed in Fig. 2. In our present embodiment we have provided clutching means for effecting a direct drive connection between annulus gear 34 and carrier 39, this clutching means comprising the aforesaid shiftable clutch device 47. A clutch member 63 is fixed to the splines 36 of shaft 28 and is provided with an external set of clutching teeth 64 projecting outwardly for engagement with teeth 46 of clutch device 47 when the latter is shifted rearwardly while maintaining clutching engagement of device 47 with hubs 43 and 50. Thus the clutch device 47 will directly connect hub 43 with clutch member 63 and thereby direct drivingly connect carrier 39 with annulus gear 34 by reason of the latter having connection with driving shaft 28.

We preferably provide means for synchronizing the speeds of rotation of hub 43 and clutch member 63 so that during the rearward shift of clutch device 47 the teeth 46 will engage teeth 64 without clash and only when these parts are synchronized. In order to arrange for such functions, an obstructing or blocking ring 65 engages the forward face of member 63, this ring carrying a plurality of forwardly extending pins 66 engaging openings 67 formed in the hub 43, these openings extending circumferentially beyond the associated pin 66 to provide a small clearance 68 (Fig. 4A) sufficient to accommodate slight rotation of ring 65 relative to hub 43 while at the same time maintaining rotative connection between the hub and ring. Yielding means may be arranged, preferably in the form of a plurality of springs, for frictionally engaging ring 65 with member 63 and in Fig. 4 one of these springs is shown at 69.

The ring 65 is formed with external obstructing clutch teeth 70 adapted to be axially aligned with teeth 64 when hub 43 and shaft 28 are synchronized. When clutch device 43 is shifted rearwardly for the direct drive clutching action, the ring 65 will ordinarily be disposed so that teeth 70 will be misaligned axially with respect to teeth 64, this misalignment being accommodated by the clearance 68 and when the teeth 46 of device 47 are forced rearwardly against the front bevelled faces of teeth 70, the ring 65 is frictionally urged against member 63 to bring this member into synchronized relationship with respect to hub 43, thereby slightly rotating ring 65 relative to hub 43 sufficiently to axially align teeth 46, 70 and 40 whereupon device 47 may continue its rearward shifting movement and bring the clutching teeth 46 into positive clutching engagement with the teeth 64 to complete the clutching action.

When the clutching device establishes direct drive connection between hub 43 and clutch member 63, the planetary gearing will rotate forwardly as a unit and a direct drive will be established between shafts 28 and 33, the overrunning device F automatically acting to accommodate the attendant forward rotation of sun gear 52 and control cylinder 53 thereof.

In this embodiment of our invention the direct drive clutching means is adapted for control by the vehicle driver to selectively enable either a sustained underdrive or a direct drive through the underdriving mechanism C. The device 47 is formed with a shifting collar 71 engaged by the blocks 72 carried by yoke 73 fixed to a transverse shaft 74 which extends outwardly through the casing 75 of mechanism C where this shaft is provided with a lever 76. The downwardly extending end of the lever is connected at 77 with a Bowden wire mechanism 78 which extends forwardly and upwardly to a plunger operator 79 formed with a knob 80 adapted to be operated by the vehicle driver.

The plunger 79 is slidably mounted in a housing 81 fixed to the usual instrument board panel or dash 82, the plunger being provided with a pair of spaced grooves 83 and 84 selectively engageable with the spring-pressed ball detent 85 in order to releasably hold the plunger 79 in the two positions of its selective adjustment. When the knob 80 is pulled rearwardly, as in Fig. 1, the clutch device 47 is positioned as in Fig. 4 to provide the underdrive through mechanism C and when the knob is positioned forwardly to engage groove 84 with detent ball 85, then the clutch device 47 is shifted rearwardly to establish the direct drive between shafts 28 and 33.

If desired, the control cylinder 53 may have a second overrunning control device associated therewith and generally indicated at G, this device comprising the overrunning clutch rollers 86 engaging between the cylindrical surface 87 of cylinder 53 and the cammed faces 88 of a cam member 89 secured to the splines 36 of shaft 28. The device G comprises a reversely acting overrunning clutch such that shaft 28 may rotate freely forwardly faster than cylinder 53 while preventing this cylinder from rotating forwardly faster than shaft 28. By reason of this arrangement the engine is prevented from falling below the speed of driven shaft 33 since, with the parts arranged as in Fig. 4, any tendency of the engine to fall below the speed of shaft 33 will cause a tendency of the sun gear 52 to rotate forwardly faster than shaft 28 thereby wedging rollers 86. In many instances it will be preferred to omit the controlling device G.

Referring now to the change speed transmission D, the latter has a casing structure 90 secured by fasteners 91 to the casing 75 at the rear of mechanism C, a bearing 92 rotatably journalling shaft 33 which extends rearwardly into the transmission D. Shaft 33 is formed with the main drive pinion 93 and direct drive clutch teeth 94, this pinion meshing with the driving gear 95 and the countershaft cluster gearing 96 also formed with a low speed driving gear 97 and a reversing gear 98 which is in continuous mesh with a reverse idler gear 99.

The drive is taken from transmission D by power take-off or driven tail shaft 100 driving the usual speedometer gearing 101 and having the propeller shaft braking drum 102 operably connected in the drive between the tail shaft and propeller shaft 20 for transmitting the drive to the vehicle ground wheels 22.

The tail shaft 100 has its forward end piloted in the rear end of shaft 33 and journalled therein by a bearing 103, the tail shaft having splines 104 slidably mounting a shiftable gear 105 adapted for forward and reverse shifting by a yoke 106. Forward shifting of this gear meshes the same with countershaft gear 97 to provide a reduction drive from shaft 33 to the tail shaft 100 while rearward shifting of gear 105 meshes the same with reverse idler gear 99 thereby transmitting a reverse drive to the tail shaft from shaft 33.

Slidably mounted on forward splines 107 of the tail shaft is a hub 108 carrying the synchronizing friction clutch part 109 engageable with a companion clutching surface 110 carried by shaft 33. A shifting clutch sleeve 111, shiftable by a yoke 112, has clutch teeth 113 slidably engaging the external teeth 114 of hub 108, teeth 113 being adapted for positive clutching engagement with teeth 94 to provide a forward direct drive connection between shaft 33 and tail shaft 100.

The clutch sleeve 111 is releasably connected with hub 108 by the spring-pressed ball 115, well known in connection with synchronization structures, so that when the sleeve 111 is shifted forwardly the shaft 33 will be synchronized with tail shaft 100 at the friction parts 109 and 110 and then the sleeve will move forwardly relative to hub 108 to engage teeth 113 with teeth 94.

The shiftable yokes 106 and 112 are respectively secured to the shift rails 116 and 117 and the rails are adapted for selective shifting engagement with a shift lever 118 which extends upwardly in the housing 119 where it has universal support at 120. The shift lever 118 is provided with a terminal shift knob 121 which is illustrated in Fig. 3 in the neutral position.

The knob 121 is adapted for selective shift movement in a substantially H-shaped path although one of the legs or arms of the H path is omitted inasmuch as transmission D is arranged to provide only two forward speed ratios and reverse. When knob 121 is moved along the path indicated in Fig. 3 to the various positions 121' and 121", the rail 116 is correspondingly shifted to selectively engage gear 105 with gears 97 and 99, respectively. When knob 121 is shifted to the position 121''', the rail 117 is shifted to operate clutch sleeve 111 forwardly to establish the direct drive from shaft 33 to tail shaft 100.

In the operation of the power transmission as a whole, the vehicle may be forwardly started with the clutch device 47 either in the forward underdrive position thereof, or in the rear direct drive position and also by manipulating handle 121 from neutral either to the low speed drive station 121' or to the direct drive station 121'''. In manipulating the transmission D as well as the clutch device 47, it is, of course, desirable for the operator to depress pedal 31 to release clutch D and thereafter release the clutch pedal to establish the selected drive.

With transmission D manipulated for a forward reduction drive, gear 105 being meshed with gear 97, and with clutch 47 in the Fig. 4 position, the engine will forwardly drive shaft 28 to provide a reduction drive through the planetary gearing of mechanism C to the driven shaft 33 and this underdrive will be compounded with the reduction drive of transmission D so that a double reduction will be afforded from shaft 28 to the tail shaft 100.

Assuming clutch device 47 is still left in the forward Fig. 4 position, the transmission D may then be manipulated for a direct drive by engaging clutch sleeve 111 with teeth 94 whereupon shaft 28 will forwardly drive shaft 33 as well as tail shaft 100 through the single reduction afforded by the planetary train of mechanism C thereby stepping-up the drive through the power transmission. This drive is approximately equivalent, from the engine A to the ground wheels 22, to a direct drive in more conventional power transmission systems because, as aforesaid, we have arranged our differential E at the rear axle for a relatively faster speed ratio. If desired the knob 80 may be left in the underdrive position although the benefits of the still faster drive are readily obtainable at any time by the driver pushing knob 80 forwardly to establish a direct drive through the mechanism C.

With mechanism C and transmission D both manipulated to effect a direct drive therethrough, then shafts 28, 33 and 100 will all drive forwardly at the same speed with the resulting relatively slow operation of the engine, fuel economy, and the aforesaid advantages attendant with overdrive devices in general. In view of the control by the driver of knob 80, the benefits of a direct drive through mechanism C may be obtained even for city driving since faster acceleration may be conveniently obtained at any time either by manipulating shift lever 118 for the low speed drive in transmission D or preferably by pushing handle 80 forwardly to release teeth 64 from teeth 46 of clutch device 47. The latter operation will immediately restore the underdrive in mechanism C and offers a convenient step-down control for the driving speed ratio through mechanism C.

When a reverse drive is desired, then the shift lever 118 is manipulated to the reverse station 121'' to engage gear 105 with reverse idler gear 99 and shaft 33 will drive tail shaft 100 in reverse. During the reverse drive the knob 80 may be positioned rearwardly as in Fig. 1 to obtain the benefit of the underdrive through mechanism C as well as the reduction drive afforded by transmission D although if a faster reverse drive is desired, the mechanism C may be manipulated for a direct drive therethrough.

In place of the friction type clutch B, illustrated in Fig. 1, we also contemplate the use of a fluid coupling between the engine and driving shaft 28 and this embodiment of our invention will be referred to in greater detail hereinafter in connection with Fig. 14.

Referring now to the embodiment of our invention illustrated in Figs. 5–13, we have illustrated a power transmission embodying a forward underdrive mechanism which is adapted to transmit one of two selectively operating reduction drives or a direct drive to a rearwardly disposed power transmission. Since the underdrive mechanism is now arranged to accommodate a step-up reduction drive, the rear power transmission is preferably arranged to selectively provide either a direct forward drive or a reverse drive. In this embodiment of our invention the step-up reduction drive in the underdrive mechanism is effected by an automatically operating centrifugal clutch adapted to function in response to the speed of travel of the car and the clutching means for effecting a direct drive through the underdrive mechanism is illustrated as a pressure fluid operated clutch adapted for engagement in response to predetermined car speed or with respect to some part of the power transmission having a speed proportionate with that of the car. We have also provided a system of controls so arranged that the underdrive mechanism may be conveniently manipulated for a reduction or direct drive in response to driver operation of a control element acting on the valving means which controls the supply of pressure fluid to the direct drive control clutch.

Referring particularly to Fig. 5 the engine A is now arranged so that the crankshaft thereof will drive the impeller 122 of any well known type of fluid coupling B', the runner 123 thereof having direct drive connection with the driving shaft 124 which extends into the underdrive mechanism C' which, as before, is adapted to drive the rearwardly disposed transmission D' from whence the drive is taken to the tail shaft 125.

The driving shaft 124 is formed with splines 126 and 127, the latter having engagement with spider 128 carrying the annulus gear 129 which, as before, meshes with planet gears 130 mounted on axles 131 supported by the spider 132 having the rearwardly extending cylindrical driving portion 133 adapted for continuous drive connection with the driven shaft 134. Sun gear 135 meshes with pinions 130 and extends forwardly to provide the control cylinder 136, and then outwardly at spider 137 to provide the clutch drum 138 internally splined at 139.

Secured to splines 126 is a hub 140 which extends outwardly at spider 141 to provide the driving clutch member 142 having the external splines 143. Splines 139 are slidably engaged with the clutch pressure plate 144 and a series of driven discs 145 while splines 143 are slidably engaged by the driving plates 146 carrying a friction material 147 the arrangement being such that when the pressure plate 144 is moved rearwardly the various discs of the direct drive clutch designated as H are packed together to establish a direct drive connection between driving shaft 124 and the clutching portion 138 of sun gear 135. Thus, as before, the direct drive clutching means is adapted to lock the planetary gearing as thus far described by reason of the fact that annulus gear 129 is directly connected with hub 140 through the driving shaft 124 so that when clutch H is engaged the sun gear 135 and annulus gear 129 will be clutched together thereby causing the gearing and the carrier 132 to rotate as a unit with the driving shaft 124.

The overrunning control device F' is substantially identical with the corresponding device F of the preceding embodiment with the exception that the outer cylindrical member 148 now has a forwardly extending drum portion 149 adapted to be releasably held by the braking or holding means J (Fig. 11). If desired, the aforesaid overrunning clutch G may be provided between hub 140 and cylinder 136 just as in the preceding embodiment.

We have illustrated the braking means J in the form of a friction device adapted normally to hold drum 149 against rotation and we have provided means under control of the driver for effecting release of this braking means when desired. Referring particularly to Figs. 9 and 11, the braking means comprises a contractile brake band 150 carrying the friction material 151, the band having adjacent end portions at the bottom of drum 149 carrying the heads 152 and 153 respectively urged toward each other to engage the brake J by the springs 154. Each of these springs thrusts against an abutment member 155 thrusting against the casing 156 through the adjustable supports 157.

For releasing the brake J we have formed the casing 156 with a cylinder 158 having a pair of oppositely moving pistons 159 for respectively thrusting against the abutments 152 and 153, the pistons being maintained in proper spaced relationship by a light spring 160. Pressure fluid, such as oil, is supplied by a pipe 161 opening in cylinder 158 between the pistons 159 so that when pressure fluid is introduced to the cylinder the pistons 159 will be moved away from each other to expand the band 150 against the action of springs 154 in releasing brake J. As soon as the pressure fluid is released, then the springs 154 will return the band 150 to the Fig. 11 position in normal braking relationship with respect to drum 149.

The pipe 161 (Fig. 5) leads forwardly to a master cylinder 162 having the oil reservoir 163 for replenishing the system with oil through the passage 164. The master cylinder slidably receives the piston operator 165 actuated by piston rod 166 which extends rearwardly for pivotal connection at 167 to the pedal 168 pivotally mounted at 169. When the operator depresses pedal 168 the piston 165 pumps the fluid in the master cylinder under pressure through the supply pipe 161 for releasing brake J as aforesaid. A spring 170 serves to yieldably hold the pedal 168 in its normally released position illustrated in Fig. 5. The clutch H is preferably engaged by pressure fluid introduced in a pressure fluid motor comprising an annular cylinder 171 which slidably receives the annular piston assembly 172 adapted to thrust through the thrust bearing 173 for transmitting the clutching movement to the pressure plate 144. Fluid, such as oil, is supplied to cylinder 171 by a passage 174 formed in the transversely extending boss 175 of the transverse wall 176 of the fluid coupling stationary housing 177. Communicating with the passage 174 is a supply pipe 178 which (Fig. 5) extends rearwardly to the valving means K (Fig. 7).

This valving means K comprises a casing 179 formed with a cylinder 180 slidably receiving a valve member 181 formed with a reduced portion 182 between the heads 183 and 184, the reduced portion forming the annular chamber 185. As will presently be apparent, pressure fluid is supplied to the valving means by the passage 186 (Fig. 13) which, with valve 181 disclosed as in Fig. 7, is closed at cylinder 180 by the head 184. This is the position of the valve when clutch H is disengaged at which times the oil is free to drain from cylinder 171 back to pipe 178 and into the chamber 185 which then communicates with a second passage 187 extending inwardly to drain the oil into the reservoir 188 of transmission casing 189.

When the valve member 181 is moved forwardly the head 183 closes drain passage 187 and head 184 opens the inlet passage 186 while chamber 185 maintains communication with pipe 178 so that at such a time the pressure fluid may be admitted from passage 186 through chamber 185 and thence through pipe 178 to a cylinder 171 for engaging clutch H. The supply passage 186 may be connected with drain passage 187 by a metering passage 190, the pressure fluid pump, presently referred to, having sufficient capacity to supply the necessary pressure fluid to operate clutch H even though passage 186 is open unrestrictedly to drain passage 187 by reason of the metering passage 190, the purpose of which will be more apparent presently. The head 184 is provided with the axially spaced grooves 191 and 192 selectively engaged by the spring-pressed ball detent 193 in order to yieldingly maintain the valve member 181 in either of its positions of pressure fluid control.

The valve member 181 has an axial bore 195 slidably receiving the rod portion 196 of a Bowden wire mechanism 197, the rod having a head 198 forming an operating connection between the Bowden wire mechanism and the valve member 181. This rod head 198 is received in the enlarged bore 199 of the valve head 183 and has its rear face engaged by a plug 200 threaded into the rear end of head 183 whereby the rod head 198 is fixed to valve 181. The valve cylinder 180 has its ends closed by the screw plugs 201 and 202.

The Bowden mechanism 197 extends forwardly (Fig. 6) for connection to a lever 207 fixed to the lower end of an operating rod 208 mounted at one side of the steering post or column 209 which, at its upper end, carries the usual vehicle steering wheel 210 adapted to transmit steering movements to the front steering ground wheels (not shown) through the usual operating shaft 211 in a well known manner. The upper end of rod 208 is adapted for actuation by a driver control element or selector lever 212 which extends laterally sufficiently for convenient manipulation just below the steering wheel 210. It will be apparent that when the selector element 212 is shifted forwardly to the position 212', the lever 207 will be likewise swung to pull through the Bowden mechanism 197 and cause the head 198 to move the valve 181 forwardly until notch 191 engages with ball detent 193 thereby establishing communication between pressure fluid supply passage and pipe 178 for effecting engagement of clutch H. When the selector element 212 is returned to the Fig. 6 position, head 198 will operate to restore valve member 181 to its Fig. 7 position for releasing clutch H.

Referring now to Fig. 9, the output cylindrical portion 133 of carrier 132 extends rearwardly in the casing portion 220 of mechanism C' and is formed with a second annulus gear 221 for engagement with a compound planet gear 222 having stepped portions 223 and 224. The gear portion 223 meshes with annulus gear 221, this planet gear being rotatably mounted on an axle shaft 225 supported by a carrier structure 226. As generally customary in planetary gearing, a plurality of planet gears are preferably provided such as three in number at substantially equally spaced locations around shaft 134.

The planet gear portion 224 meshes with a sun gear 227 loosely journalled on shaft 134, this sun gear having a rearward controlling extension 228 which comprises the cam member of the further overrunning control or releasable braking means L. This overrunning device L is provided with the wedging rollers 229 engaging the cam faces of control member 228 and also with the cylinder portion 230 of an outer cylinder 231 which is fixed to casing 220 to prevent rotation thereof.

Figure 12:
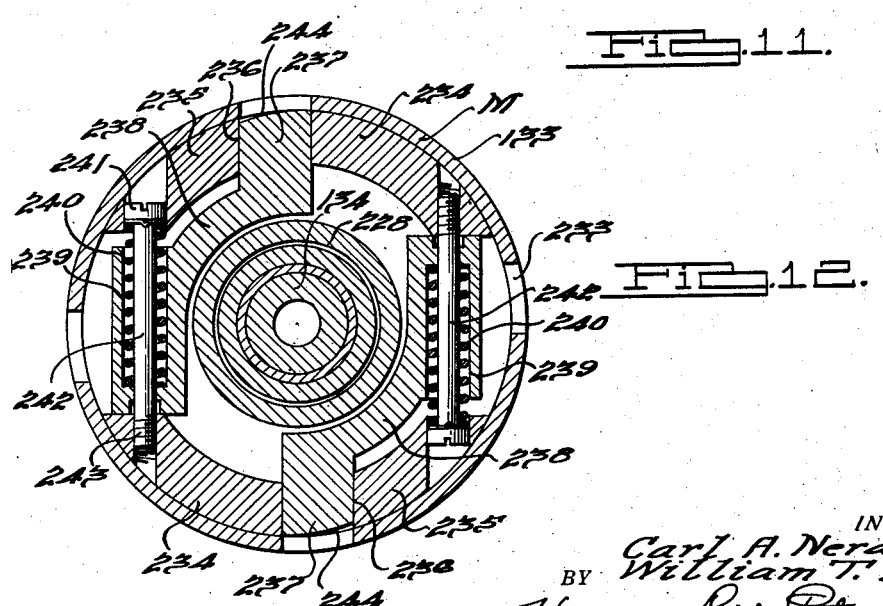
Fig. 12 is a sectional elevational view of the automatic centrifugal clutch, the view being taken as indicated by line 12—12 of Fig. 9.

The forward portion of carrier 226 is drivingly connected by splines 232 with the forward end portion of driven shaft 134. When the carrier 132 is rotated forwardly and with driven shaft 134 resisting rotation of carrier 226, forward rotation of annulus gear 221 tends to drive sun gear 227 backwards whereupon control device L automatically operates by a wedging action of rollers 229 to prevent backward rotation of this sun gear, thereby resulting in a forward drive of carrier 226 and driven shaft 134 at a speed less than that of carrier 132. However, the carrier 132 is always in drive connection with driven shaft 134 either through the planet gears 222 or by reason of a direct drive connection established by engagement of an automatic centrifugal clutch M (Fig. 12).

The automatic clutch M comprises two clutching structures, one of which is formed with slots and the other of which is in the form of a centrifugally operated pawl or bolt adapted for engagement with one of the slots of the other clutching structure preferably limited to the obtainment of a synchronously rotating condition of the clutching structures.

The slotted clutching structure is formed as a rear extension of the cylinder 133, this extension being formed with a plurality of circumferentially spaced slots 233 while the other clutching structure is carried by the cage formed as a part of the rear portion of carrier 226. This cage has the diametrically opposite pairs of carrier projections 234 and 235 forming a pair of substantially diametrically opposite guide-ways 236 each slidably receiving a clutching pawl 237. If desired, only one pawl may be employed although if the pawls are of the form illustrated they are preferably two in number in order to maintain a rotative balance. Each pawl 237 may be formed with a yoke counter-balancing portion 238 formed with a spring-receiving recess 239 for receiving a spring 240 for normally holding the yoke portion 238 against a projection 234 for limiting inward movement of the pawl 237. Each spring 240 acts against the head 241 of an abutment rod 242 threadedly supported at 243 in a projection 234 so that the associated pawl 237 can move outwardly by centrifugal force against retracting spring 240 for engagement with one of the slots 233, the outward pawl movement being limited by the yoke portion engaging a projection 235.

Each pawl 237 preferably has an outer cammed face 244 to assist the pawl in jumping the slots prior to synchronization of the clutching structures and also to assist in engagement of the pawl with the slot when the clutching structures are synchronized as generally well known for the type of clutch illustrated at M.

In the operation of the automatic clutch M, the retracting springs 240 may be adjusted to the desired speed of engagement of the clutch or springs of varying strengths may be substituted, as desired, and as an example operation in the power transmission illustrated, we may arrange for projection of the pawls 237 at a vehicle travelling speed of ten to fifteen miles per hour when driving in the compound planetary gearing of mechanism C' so that the clutch M when operated will effect a step-up in the drive equivalent, generally speaking, to an intermediate or second speed. When the clutch M engages the rear set of planetary gearing meshing with planet gears 222, this planetary gear set will be locked to rotate as a unit so that carrier 132 will drive carrier 226 and driven shaft 134 all at the same speed. More particularly when clutch M engages, the annulus gear 221 will be directly drivingly connected with the carrier 226 for locking the train. It will be noted that the clutching structures of the automatic clutch M are driven with the out-put members 132 and 226 respectively of the two planetary trains comprising the mechanism C'. If desired, the rear planetary train may be omitted and the carrier 132 directly drivingly connected with the driven shaft 134 either with or without the intermediate shiftable clutch device 47 of the Fig. 4 embodiment.

When the drive is taking place from driving shaft 124 to driven shaft 134 with both of the planetary trains operating, as in initially accelerating the car from standstill and with clutch M disengaged, it will be apparent that the slots 233 are rotated at a speed faster than the pawls 237 by the rotational difference depending on the value of the rear planetary gear train. During this drive the sun gear 227 is held against backward rotation by the overrunning device L whereby the sun gear provides reaction for effecting the forward reduction drive just as the overrunning device F' operates to hold sun gear 135 to provide drive connection for driving through the forward planetary gear train. After the vehicle has been accelerated to a speed corresponding to the critical speed of engagement of clutch M or to a higher speed, the pawls 237 are urged outwardly and cammed across the slots 233 until such time as the driving shaft 124 is reduced in speed by the driver releasing the accelerator pedal sufficiently to permit the slots 233 to reduce in speed to approximately that of the pawls 237 at which time the clutching structures of the automatic clutch will be synchronized and the pawls projected outwardly so that each will engage one of the slots 233 at the same time. Engagement of clutch M is therefore limited to a condition of engine coast by causing momentary reversal of the normal direction of the torque flow through transmission C', either before or after engagement of clutch H, whereas this clutch will engage automatically to step-up the drive through the transmission during acceleration of the vehicle from rest in one of the reduction drives provided by the transmission. When the automatic clutch M is engaged the rear planetary train becomes locked, thereby effecting a step-up in the reduction drive and then the driving shaft 124 will operate through the forward planetary train in stepping-up the reduction drive and sun gear 227 will be carried forwardly at the speed of carrier 132 accommodated by automatic release of the rollers 229 of overrunning device L. When the car speed falls below the critical speed of clutch M, the springs 240 will act to retract the pawls 237 and thereby automatically release the direct drive between carriers 132 and 226 for restoring the mechanism C' for operation of the rear planetary train as a reduction drive.

When it is desired to release the drive from shaft 124 to shaft 134, the driver depresses pedal 31 to release brake J, thereby rendering the overrunning device F'' ineffective to prevent backwards rotation of sun gear 135 and thus the forward drive of shaft 134 is released. This release of brake J is of particular significance when the fluid coupling B' is employed making it desirable to release the drive to transmission D' when the car is at a standstill in order to facilitate shifting this transmission for the forward and reverse drive without clashing the transmission mechanism although depressing pedal 31 under all reduction driving conditions through mechanism C' will release the drive through the power transmission because all of these reduction drives depend on engagement of brake J to enable overrunning device F' to hold sun gear 135 against backward rotation and enable this sun gear to take drive reaction. Of course, when the direct drive clutch H is engaged then sun gear 135 is rotated forwardly and overrunning device F'' automatically releases the sun gear so that under such conditions release of brake J will not release the drive from shaft 134 to shaft 124. The release of the direct drive clutch H is effected by shifting selector element 212 to the Fig. 6 position. In this connection, the element 212 offers a convenient control when it is desired to set the valve 181 in the position for sustained underdrive, and for convenient release and engagement of clutch H while driving the vehicle under various conditions the element 212 will also be found to be readily accessible.

Referring now to the transmission D', the intermediate or driven shaft 134 extends rearwardly within the casing 189 and is formed with the main drive pinion 245 and the direct drive clutch teeth 246 preferably having associated therewith the synchronizing friction clutch member 247. Pinion 245 meshes with gear 248 of the countershaft 249, the latter also having the reverse drive gear 250 in constant mesh with the reverse idler gear 251 (Fig. 13) rotatably supported on the idler shaft 252. Gear 251 is in constant mesh with reverse gear 253 loosely journalled on the tail shaft 125, this reverse gear carrying the clutch teeth 254 and having associated therewith the synchronizing clutch member 255.

The tail shaft is journalled in casing 189 by bearing 256 and has its forward end portion 257 piloted within the rear end portion of driven shaft 134, the tail shaft being splined at 258 to receive the fixed hub 259 externally splined to slidably engage the clutch teeth 260 of the shiftable clutch sleeve 261. This sleeve is adapted for forward or rear shifting by the blocks 262 operating in the groove 263, the blocks being carried by a shift yoke 264 connected to a rock shaft 265 which extends transversely outside of casing 189 (Fig. 5) to carry a lever 266.

Associated with the clutching members 247 and 255, we preferably provide some form of synchromesh, that illustrated comprising the blocker or control rings 267 and 268 respectively adapted to block forward and rearward shift of sleeve 261 until sleeve 261 is synchronized either with teeth 246 or teeth 254. The particular form of synchromesh illustrated is more particularly described and claimed in the application of Otto E. Fishburn, Serial No. 180,840, filed December 20, 1937. If desired, the synchronizing structure may be omitted and the sleeve 261 selectively clutched with the synchronizing action either with the teeth 246 or with teeth 254 for respectively effecting direct or reverse drives from shaft 134 to the tail shaft 125. The direct drive passes from shaft 134, teeth 246 and clutch sleeve 261 thence through hub 259 to the tail shaft. When the clutch sleeve 261 is shifted rearwardly to clutch with teeth 254, then the reverse drive is taken from shaft 134 through the countershaft gearing 245, 248, 250, 251 and 253, thence from teeth 254 and sleeve 261 to the tail shaft.

We will now describe the means under control of the vehicle driver for manipulating the transmission D' to effect the selective forward or reverse shift of the clutch sleeve 261. The lever 266 (Fig. 5) is connected with Bowden wire mechanism 270 which extends forwardly for connection to a lever 271 similar to the aforesaid lever 207 (Fig. 6) and disposed at the opposite side of the steering post 209. Likewise the lever 271 is fixed to a shaft 272 which extends upwardly in a manner similar to the aforesaid shaft 208 for connection to a second selector element or lever 273 extending in a direction oposite to the selector element 212.

In Fig. 6 the selector element 273 is illustrated in its neutral position and when this element is shifted forwardly to the position 273' the Bowden mechanism 270 operates through lever 266 and yoke 264 to shift the clutch sleeve 261 into clutching engagement with the direct drive teeth 246 to establish the aforesaid direct drive from shaft 134 to the tail shaft 125. When the selector element is shifted rearwardly to the position 273'' the clutch sleeve 261 is shifted rearwardly to engage the reverse drive clutch teeth 254 in order to effect the aforesaid reverse drive to the tail shaft 125 for driving the vehicle in reverse. In the event that the drag through the fluid coupling B' tends to drive shaft 134 slowly forwardly when the engine is idling and the vehicle is standing still, then it is desirable in initially accelerating the car to depress pedal 168 to release the brake J in order to unload shaft 134, thereby enabling the clutch sleeve 261 to be shifted either forwardly or rearwardly without clashing or breaking the clutch teeth.

The underdrive mechanism C' provides an inherent underdrive independent of the pressure fluid by reason of the overrunning devices F'' and L which automatically operate to prevent backward rotation of sun gears 135 and 227 respectively, the brake J being normally engaged. In getting the car started it is therefore only necessary to shift the clutch sleeve 261 from its neutral position in order to establish a driving relationship from shaft 134 to the tail shaft 125. This inherent underdrive starting ratio is provided by compounding the forward and rear planetary trains of mechanism C' and after the car has been accelerated to the critical speed of the automatic clutch M, the driver may momentarily release the usual accelerator pedal to synchronize the aforesaid clutching structures of clutch M in order to step-up the reduction drive by locking up the rear planetary train and the car may then be further accelerated through a speed ratio drive provided by the forward planetary train only. If it is desired to accelerate the vehicle in the compounded planetary gear trains to a speed sufficient to effect engagement of clutch H without first synchronizing automatic clutch M, then the driver need only to continue to depress the accelerator pedal without momentary release thereof and the clutch M will engage as soon as the clutching structures are thereafter synchronized.

Figure 13:
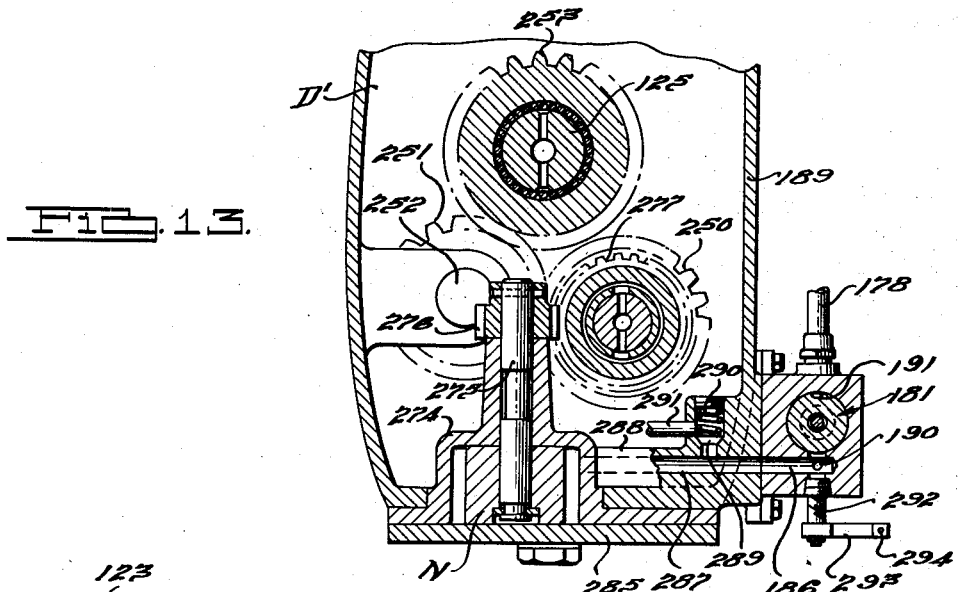
Fig. 13 is a sectional elevational view illustrating the pressure fluid pump, the view being taken as indicated by the line 13—13 of Fig. 9.

The clutch H is so arranged that it will automatically release the direct drive when the car speed falls below a predetermined desired point and will likewise automatically engage when the car speed is above this point. We prefer to arrange the clutch H for engagement by pressure fluid under control of the valving means K, the pressure fluid being supplied by any suitable type of pumping means. In Fig. 13 we have illustrated a pump N of the well known gear type disposed in a housing 274 and driven by a shaft 275 having a gear 276 driven from the countershaft gear 277. With such an arrangement the pump N drives whenever the shaft 134 is rotating and since this shaft has only forward rotation it will be apparent that the pump N will be operated for either forward or reverse drives of the vehicle and when the clutch sleeve 261 is correspondingly shifted forwardly or rearwardly.

The oil in the aforesaid reservoir 188 of transmission D' is allowed to drain forwardly through suitable openings 278 through the casings 189 and 220 and into the reservoir or sump 279 in the bottom of casing 220 (Fig. 9). The pump draws the oil from reservoir 279 through a filtering screen 280, thence rearwardly along the passage 281 of bottom cover 282. From passage 281 the oil travels through the passage 283 in casings 220 and 189 and thence through a passage 284 in the bottom cover 285 and to the pump by the intake passage 286.

Pressure fluid is delivered from pump N (Fig. 13) by a delivery passage 287 formed in the boss 288 of casing 189, excess pressure fluid unseating a valve 289 loaded by spring 290 so that the excess pressure fluid will be delivered through a pipe 291 preferably to lubricate parts of the transmission. The passage 287 extends outwardly for communication with the aforesaid passage 186 for delivery of pressure fluid to the valve member 181. The drain passage 187 is open to delivery passage 186 by the connecting metering passage 190, the pump N having sufficient delivery capacity to effect engagement of clutch H at the desired speed of pump operation.

In order to regulate or control the engagement of clutch H with respect to car speed and the speed of the drive to the pump N in accordance with the desires of the vehicle driver and in order to compensate for any conditions in the transmission which might alter any established settings, such as variations in oil viscosity, we have provided means for regulating the delivery of pressure fluid through the vent passage 190 in the form of a metering screw 292 rotatable by an outwardly extending lever 293 connected to a Bowden wire mechanism 294 which extends forwardly and upwardly to a suitable point of control, preferably at the usual instrument panel or dash 295. At this point the Bowden mechanism is connected to a plunger 296 which is provided with a knob 297 comprising a driver operated control element for regulating the time of pump build-up when the car is initially accelerated for determining the engagement of clutch H. The plunger 296 is slidably mounted in a dash block 298 and is held in any position of adjustment by a spring-loaded friction shoe 299.

When the operator pulls the handle 297 to any desired position, the Bowden mechanism 294 operates to rotate the metering screw 292 inwardly, thereby correspondingly restricting the vent passage 190 and, if desired, entirely closing off this passage to effect a rapid build-up of the pressure fluid delivery from pump N to the motor at piston 172 for engaging clutch H.

In the operation of the power transmission illustrated in Figs. 5–13, the parts are shown in their neutral positions. In order to accelerate the car forwardly, for example, the driver will ordinarily depress the pedal 168 to release brake J and thereby disconnect driven shaft 134 from the driving shaft 124 especially when the engine is rapidly idling sufficiently to induce forward rotation of shaft 134 by reason of the drag effect through the fluid coupling B'. The operator will then manipulate selector element 273 forwardly to the station position 273' which will forwardly shift clutch sleeve 261 of transmission D' forwardly to engage the direct drive clutch teeth 246. Upon release of the pedal 168 and the usual acceleration of engine A, the vehicle will then drive forwardly in its lowest speed ratio.

This forward low speed drive is effected by reason of overrunning devices F' and L which automatically prevent backward rotation of sun gears 135 and 227 respectively, thereby enabling these sun gears to take drive reaction and the resulting drive will take place as a compounded underdrive through the forward and rear planetary trains of the underdrive mechanism C'.

The vehicle is then being initially accelerated forwardly and the pump N will be operated to deliver pressure fluid to the passage 186 of the valving means K and, for purposes of illustration, it will be assumed the selector element 212 has been left in the underdrive position illustrated in Fig. 6 whereby the valve member 181 will prevent delivery of pressure fluid through pipe 178 to the clutch H. This position of selector element 212, in effect, locks out the operation of direct drive clutch H so as to enable sustained underdrive.

After the vehicle has accelerated in the compound planetary gearing up to or above the critical speed of automatic clutch M, for example 10–15 miles per hour, then by momentary release of the accelerator pedal the slots 233 are synchronized with the pawls 231 and the clutch M will engage to thereby establish a direct drive from carrier 132 to carrier 226 and driven shaft 134. This provides an automatic step-up in the reduction drive and, with the relatively fixed rear axle, the drive through the forward planetary underdrive train will afford substantially the equivalent in overall driving ratio to a direct drive in conventional power transmission systems.

In starting the car in reverse substantially the same operation is effected as in starting forwardly although the selector element 273 is moved rearwardly instead of forwardly to the position 273'' in order to effect rearward shift of clutch sleeve 261 to engage the reverse clutch teeth 254. Ordinarily the car will not be driven in reverse at a speed sufficient to effect engagement of automatic clutch M to step-up the reduction drive through mechanism C', although the automatic clutch may be engaged if the car speed in reverse is sufficient in conjunction with the critical speed of the automatic clutch M.

When the car is being driven at or above predetermined desired speed sufficient to cause pump N to deliver pressure fluid for engaging clutch H, the driver may shift the selector element 212 forwardly to the position 212' and thereby move valve member 181 forwardly to close off the drain 181 from pipe 178 and open this pipe to the pressure fluid supply passage 186. This will cause clutch H to engage, the overrunning device F' automatically releasing the sun gear 135 which now rotates forwardly as a unit with the input annulus gear 129 and the carrier 132. At this time the automatic clutch M will ordinarily be engaged so that a direct drive is established from shaft 124 to shaft 134. We preferably arrange the pump drive, the pump capacity and the valve system of capacity fluid passages so that with the car driving through the forward planetary gearing the clutch H will be engaged at approximately 25 miles per hour with vehicle travelling speed, thereby enabling the use of the direct drive through the power transmission as a whole for ordinary city driving. This direct drive is approximately equivalent of an overdrive condition with more conventional power transmission systems from the standpoint of the overall ratio from the engine to the vehicle ground wheels and may be conveniently used for city driving by reason of our arrangement which permits substantially effortless and almost instantaneous release of clutch H at any time when it may be desired to obtain a more favorable speed ratio drive as for rapidly accelerating the car in comparison with the speed ratio drive afforded by a direct drive through the power transmission. This step-down to the underdrive is provided merely by rearwardly shifting the selector lever from the position 212' to the underdrive position illustrated in Fig. 6. This control on the clutch H will also be found convenient when driving the car in the country as well as for city driving since it affords means for conveniently rapidly accelerating the car as in passing another vehicle and also when it is desired to deliver increased power or torque into the vehicle driving wheels 22.

The selector element 212 may also be operated as a preselective control for a direct drive through the mechanism C' when starting the car from standstill. Under such conditions the selector element may first be shifted to the position 212' although when the car is standing still the clutch H will not engage because the pump N is not operating, at least not sufficiently to deliver pressure fluid for operating the clutch. Under such conditions the car may be initially accelerated as hereinbefore stated in connection with the car acceleration when the selector element is left in the underdrive position. The car may thus be accelerated in the compound planetary underdrive and then the step-up afforded by engagement of clutch M or the car may be continuously accelerated in the compound underdrive up to the point where the clutch H will automatically engage. Unless the car speed falls below the speed at which pump N will deliver sufficient pressure fluid to engage clutch H, then the latter clutch will maintain its engagement unless, of course, the selector element 212 is moved to its underdrive position whereupon the clutch H will immediately release and the underdrive will take place through the mechanism C'.

The various controlling elements at the overrunning devices F' and L, together with the operation of clutches H and M and the brake J are so arranged that changes in the speed ratio drive including direct will be effected without jolt to the vehicle passengers or the transmission parts both in the step-up as well as in the step-down of speed ratio changes.

Figure 14:
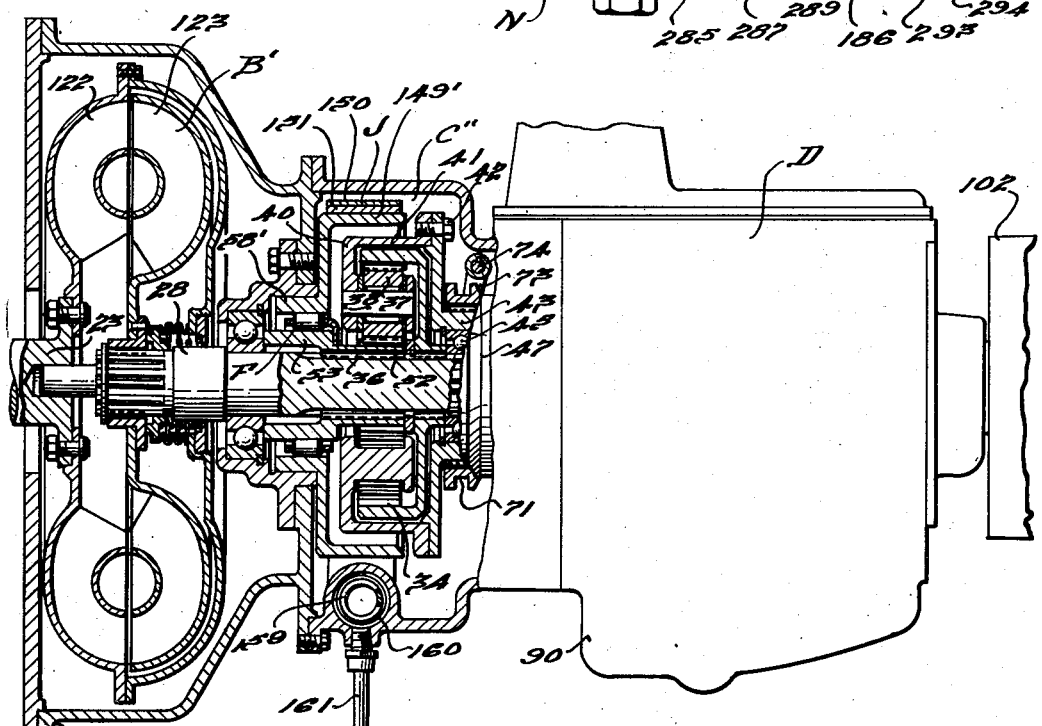
Fig. 14 is a sectional elevational view generally corresponding to Fig. 4 but illustrating a fluid coupling ahead of the underdrive mechanism, the latter being provided with releasable braking means for the overrunning device as in the Fig. 9 embodiment.

Referring now to the embodiment of our invention illustrated in Fig. 14, we have illustrated the Fig. 4 power transmission modified by the substitution of a fluid coupling in place of the friction clutch B, the omission of the Fig. 4 overrunning control device G, and we have incorporated the Fig. 11 brake J to enable release of the overrunning control device associated with the sun gear of the first planetary train.

In Fig. 14 the crankshaft 23 drives through the same fluid coupling B' as illustrated in Fig. 5 for rotating the driving shaft 28 as in Fig. 4. All parts of the mechanism C'' are identical with those illustrated in mechanism C of Fig. 4 with the exception that the control device F now has the outer member 58' thereof provided with a drum 149' normally engaged by the braking means J as illustrated in Fig. 11.

The operation of the Fig. 14 mechanism is substantially identical with that previously described in connection with Fig. 4 with the exception that the braking means J is released instead of clutch B in order to manipulate the transmission D in getting the car started from standstill, thereby relieving any drag effect in the fluid coupling B' tending to rotate shaft 28 and shaft 33 through the underdrive planetary gearing of mechanism C''. In the Fig. 14 arrangement it is not necessary to release the brake J when the car is being driven forwardly in order to manipulate transmission D, as in effecting a change from the low speed thereof to the direct drive. Under such conditions the driver will ordinarily release accelerator pedal when operating the gear shift lever 118 and the overrunning control device F will automatically release the sun gear 52 so that the shaft 93 is not being driven by shaft 28 thereby enabling synchronization and clutching of the sleeve 111 with the direct drive clutch teeth 94. The braking means J is, in effect, a clutch control for the drive between shafts 38 and 33 inasmuch as release of the brake J will, during underdrive, operate to disconnect the drive between these shafts regardless of the setting of change speed transmission D.

We do not limit our invention, in the broader aspects thereof, to any particular combination and arrangement of parts such as shown and described for illustrative purposes since various modifications will be apparent from the teachings of my invention and scope thereof as defined in the appended claims.

What we claim is:

1. In a motor vehicle planetary gear transmission; a driving shaft adapted to be driven in a forward driving direction of rotation; a shaft adapted to be driven from said driving shaft; an annulus gear driven with the driving shaft; a sun gear; a planet gear meshing with said sun gear and said annulus gear and having a carrier; means for releasably preventing backward rotation of said sun gear; clutch means including a clutch part driven with the driving shaft and a shiftable clutch member always drivingly connecting said carrier with said driven shaft; and means for shifting said clutch member into clutching engagement with said clutch part to establish drive connection between said shafts.

2. In a motor vehicle planetary gear transmission; a driving shaft adapted to be driven in a forward driving direction of rotation; a shaft adapted to be driven from said driving shaft; an annulus gear driven with the driving shaft; a sun gear; a planet gear meshing with said sun gear and said annulus gear and having a carrier; said carrier being adapted to transmit drive to said driven shaft; a member adapted to be held against rotation; an overrunning device between said member and said sun gear operable to prevent backward rotation of said sun gear; and an overrunning clutch between said sun gear and said driving shaft operable to prevent said driving shaft from rotating slower than the rotation of said driven shaft.

3. In a motor vehicle planetary gear transmission; a driving shaft adapted to be driven in a forward driving direction of rotation; a shaft adapted to be driven from said driving shaft; an annulus gear driven with the driving shaft; a sun gear; a planet gear meshing with said sun gear and said annulus gear and having a carrier; said carrier being adapted to transmit drive to said driven shaft; a member adapted to be held against rotation; an overrunning device between said member and said sun gear operable to prevent backward rotation of said sun gear; an overrrunning clutch between said sun gear and said driving shaft operable to prevent said driving shaft from rotating slower than the rotation of said driven shaft; and clutch means operable to lock said gears for forward rotation as a unit with said driving shaft.

4. In a motor vehicle power transmission having driving and driven shafts; a plantary gear train operable to transmit drive from the driving shaft to the driven shaft comprising an input annulus gear, an output planetary gear carrier, and a sun gear; a rotatable control element; braking means engaging said control element; power operating means acting to normally maintain said engagement of said braking means; pressure fluid operated means for releasing said braking means; a driver operated pump for delivering fluid under pressure to said pressure fluid operated means; and overrunning control means operable between said sun gear and said control element for preventing rotation of said sun gear in a direction opposite to the rotation of said driving shaft when said control element is held by said braking means.

5. In a motor vehicle planetary gear transmission; a driving shaft adapted to be driven in a forward driving direction of rotation; a shaft adapted to be driven forwardly from said driving shaft; an output shaft adapted to be driven forwardly or reversely from the driven shaft; planetary gearing including an input annulus gear member adapted to receive direct drive from the driving shaft, said planetary gearing including an output member and a drive-reaction-taking member adapted to be held for causing said driving shaft to drive said output member forwardly at a speed different from that of the driving shaft; releasable holding means for said drive-reaction-taking member; additional planetary gearing adapted to receive drive from said output member, said additional planetary gearing including a second output member adapted to drive the driven shaft and a second drive-reaction-taking member adapted to be held for causing the first said output member to drive the driven shaft forwardly at a speed different from that of the first said output member; second releasable holding means for the second said drive-reaction-taking member, and means for establishing selective drive connection between the output shaft and the driven shaft for driving the output shaft forwardly or reversely.

6. In a motor vehicle planetary gear transmission; a driving shaft adapted to be driven in a forward driving direction of rotation; a shaft adapted to be driven forwardly from said driving shaft; an output shaft adapted to be driven forwardly or reversely from the driven shaft; planetary gearing including an input annulus gear member adapted to receive direct drive from the driving shaft, said planetary gearing including an output member and a drive-reaction-taking member adapted to be held for causing said driving shaft to drive said output member forwardly at a speed different from that of the driving shaft; releasable holding means for said drive-reaction-taking member; additional planetary gearing adapted to receive drive from said output member, said additional planetary gearing including a second output member adapted to drive the driven shaft and a second drive-reaction-taking member adapted to be held for causing the first said output member to drive the driven shaft forwardly at a speed different from that of the first said output member; second releasable holding means for the second said drive-reaction-taking member; means for establishing selective drive connection between the output shaft and the driven shaft for driving the output shaft forwardly or reversely; clutch means for locking the gears of the first said planetary gearing; and clutch means for locking the gears of the second said planetary gearing.

7. In a motor vehicle planetary gear transmission; a driving shaft adapted to be driven in a forward driving direction of rotation; a shaft adapted to be driven from said driving shaft; planetary gearing including an input annulus gear member adapted to receive direct drive from the driving shaft, said planetary gearing including an output member and a drive-reaction-taking member adapted to be held for causing said driving shaft to drive said output member forwardly at a speed different from that of the driving shaft; releasable holding means for said drive-reaction-taking member; additional planetary gearing including a second input member adapted to receive drive from said output member, said additional planetary gearing including a second output member adapted to drive the driven shaft and a second drive-reaction-taking member adapted to be held for causing the first said output member to drive the driven shaft at a speed different from that of the first said output member; second releasable holding means for the second said drive-reaction-taking member; and speed responsive clutch means for locking the gears of one of said planetary gearing, said speed responsive clutch means comprising a pair of clutching structures respectively driven with two of the members of said additional planetary gearing, one of said clutching structures being adapted for operation by centrifugal force acting thereon into positive clutching engagement with the other when the speeds of said clutching structures are synchronized.

8. In a motor vehicle planetary gear transmission; a driving shaft adapted to be driven in a forward driving direction of rotation; a shaft adapted to be driven from said driving shaft; planetary gearing including an input annulus gear member adapted to receive direct drive from the driving shaft; said planetary gearing including an output member and a drive-reaction-taking member adapted to be held for causing said driving shaft to drive said output member forwardly at a speed different from that of the driving shaft; releasable holding means for said drive-reaction-taking member; additional planetary gearing adapted to receive drive from said output member, said additional planetary gearing including a second output member adapted to drive the drive shaft and a second drive-reaction-taking member adapted to be held for causing the first said output member to drive the driven shaft at a speed different from that of the first said output member; second releasable holding means for the second said drive-reaction-taking member; a slotted clutching structure; and a centrifugal force operated clutching structure positively engageable with the slot of said slotted clutching structure; one of said clutching structures being driven with the second said output member and the other of said clutching structures being driven with the first said output member.

9. In a motor vehicle planetary gear transmission; a driving shaft adapted to be driven in a forward driving direction of rotation; a shaft adapted to be driven from said driving shaft; planetary gearing including an input annulus gear member adapted to receive direct drive from the driving shaft, said planetary gearing including an output member and a drive-reaction-taking member adapted to be held for causing said driving shaft to drive said output member forwardly at a speed different from that of the driving shaft; overrunning control means operable to prevent rotation in one direction of said drive-reaction-taking member; additional planetary gearing including a second input member adapted to receive drive from said output member, said additional planetary gearing including a second output member adapted to drive the driven shaft and a second drive-reaction-taking member adapted to be held for causing the first said output member to drive the driven shaft at a speed different from that of the first said output member; and overrunning control means operable to prevent rotation in one direction of the second said drive-reaction-taking member, the first said output member having a hollow driving portion surrounding said input annulus gear member and transmitting drive therefrom to said second input member.

10. In a motor vehicle planetary gear transmission; a driving shaft adapted for forward driving rotation; a shaft adapted to be driven from said driving shaft; means including planetary gearing for driving said driven shaft from said driving shaft at two relatively different forward driving speed ratios; said planetary gearing comprising an input annulus gear receiving direct drive from the driving shaft and a pair of rotary control members; a pair of overrunning means respectively operable to automatically prevent rotation of each of said control members in one direction for effecting the slower of said speed ratio drives; and means including a clutch operable for effecting direct drive relationship between one of said control members and one of said shafts for providing the faster of said speed ratio drives.

11. In a motor vehicle planetary gear transmission; a driving shaft adapted for forward driving rotation; a shaft adapted to be driven from said driving shaft; means including planetary gearing for driving said driven shaft from said driving shaft at two relatively different forward driving speed ratios; said planetary gearing comprising an input annulus gear receiving direct drive from the driving shaft and a pair of rotary control members; a pair of overrunning means respectively operable to automatically prevent rotation of each of said control members in one direction for effecting the slower of said speed ratio drives; means including a clutch operable for effecting direct drive relationship between one of said control members and one of said shafts for providing the faster of said speed ratio drives; and second clutch means operable to effect locking of at least a portion of said planetary gearing whereby the other of said control members is rotated directly with the other of said shafts for establishing a direct drive between said shafts when the first said clutch means is operating as aforesaid.

12. In a motor vehicle planetary gear transmission; a driving shaft adapted to be driven in a forward driving direction of rotation; a shaft adapted to be driven from said driving shaft; planetary gearing including an input annulus gear member adapted to receive direct drive from the driving shaft, said planetary gearing including an output member and a drive-reaction-taking member adapted to be held for causing said driving shaft to drive said output member forwardly at a speed different from that of the driving shaft; releasable holding means for said drive-deaction-taking member; additional planetary gearing adapted to receive drive from said output member, said additional planetary gearing including a second output member adapted to drive the driven shaft and a second drive-reaction-taking member adapted to be held for causing the first said output member to drive the driven shaft at a speed different from that of the first said output member; second releasable holding means for the second said drive-reaction-taking member; a tailshaft adapted to be selectively driven from the driven shaft in the same or opposite direction of rotation relative to the rotation of the driven shaft; means driven by the driven shaft for transmitting a reverse drive to the tailshaft; and means for selectively drivingly connecting the tailshaft with the driven shaft or with said reverse drive-transmitting means.

13. In a motor vehicle planetary gear transmission; a driving shaft adapted to be driven in a forward driving direction of rotation; a shaft adapted to be driven from said driving shaft; planetary gearing including an input annulus gear member adapted to receive direct drive from the driving shaft, said planetary gearing including an output planet gear carrier member and a drive-reaction-taking sun gear member adapted to be held; releasable holding means for said sun gear member; additional planetary gearing adapted to receive drive from said carrier member; said additional planetary gearing including an annulus gear member, a sun gear member, and an output planet gear carrier member having direct drive connection with the driven shaft; releasable holding means for preventing rotation of one of the gear members of said additional planetary gearing; and means providing direct drive connection between the other of the gear members of said additional planetary gearing and the output carrier member of the first said planetary gearing; a tailshaft adapted to be selectively driven from the driven shaft in the same or opposite direction of rotation relative to the rotation of the driven shaft; means driven by the driven shaft for transmitting a reverse drive to the tailshaft; and means for selectively drivingly connecting the tailshaft with the driven shaft or with said reverse drive-transmitting means.

14. In a power transmission for driving a motor vehicle having an engine; a driving shaft adapted to be driven by the engine; an input annulus gear driven directly from the driving shaft; change speed mechanism including planetary gearing means for driving the driven shaft from said annulus gear at a relatively slow speed and means for driving the driven shaft from said driving shaft at a speed relatively faster than that provided by said relatively slow speed planetary gearing driving means; pressure fluid operated means for effecting operation of said relatively fast driving means; fluid pumping means for delivering pressure fluid to said fluid operated means; means for driving said fluid pumping means independently of the engine so that in stopping the vehicle with the engine running the pressure of the fluid will drop below that required to operate said fluid operated means; and control means for said relatively slow speed planetary gearing driving means operating to effect this drive independently of said fluid pumping means for starting the vehicle, said control means operating to release the relatively slow speed drive in response to operation of the relatively fast speed drive to accommodate a step-up in the drive through said change speed mechanism when said fluid pumping means operates to restore the pressure of the fluid after the vehicle is started.

15. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; and blocker means engageable with said shiftable clutching structure and operating to prevent shift thereof to engage the other of said clutching structures when said clutching structures are rotating asynchronously.

16. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; and means for preventing clutching of said clutching structures during their asynchronous rotation.

17. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and said annulus gear member and adapted when clutched together to establish a direct forward drive relationship between said annulus gear member and the driven shaft by causing all of the aforesaid members to rotate forwardly as a locked gear train; and means for preventing clutching of said clutching structures during their asynchronous rotation.

18. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and said annulus gear member and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; and blocker means engageable with said shiftable clutching structure and operating to prevent shift thereof to engage the other of said clutching structures when said clutching structures are rotating asynchronously.

19. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; a blocker member having a part thereof engageable with said shiftable clutching structure to prevent shift thereof to engage the other clutching structure when said clutching structures are rotating asynchronously; and means for driving the blocker member for rotation with one of said clutching structures to accommodate limited rotation of the blocker member relative to this clutching structure for positioning the blocker member for blocking and unblocking relationship with respect to said shiftable clutching structure.

20. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; a blocker member having a part thereof engageable with said shiftable clutching structure to prevent shift thereof to engage the other clutching structure when said clutching structures are rotating asynchronously; means for driving the blocker member for rotation with the carrier member, said means accommodating limited relative rotation between the blocker member and one of said clutching structures for blocking and unblocking positioning of the blocker member with respect to said shiftable clutching structure; and means providing an operable connection between the blocker member and one of said clutching structures for moving the blocker member to one of its said positions with respect to said shiftable clutching structure.

21. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; means for shifting one of said clutching structures relative to and toward the other for said clutching therewith; blocker means engageable with said shiftable clutching structure and operating to prevent shift thereof to engage the other of said clutching structures when said clutching structures are rotating asynchronously; an overrunning clutch member carried by one of said shafts for rotation at the same speed therewith; and overrunning clutch rollers between said overrunning clutch member and said sun gear member operating to allow the last said shaft to rotate freely forwardly relative to said sun gear member during said reduction drive but limiting forward rotation of said sun gear member to the speed of this shaft when the driving shaft is allowed to coast.

22. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and said annulus gear member and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; blocker means engageable with said shiftable clutching structure and operating to prevent shift thereof to engage the other of said clutching structures when said clutching structures are rotating asynchronously; an overrunning clutch member carried by the driving shaft for rotation at the same speed therewith; and overrunning clutch rollers between said overrunning clutch member and said sun gear member operating to allow the driving shaft to rotate freely forwardly relative to said sun gear member during said reduction drive but limiting forward rotation of said sun gear member to the speed of the driving shaft when the latter is allowed to coast.

23. In a planetary gear transmission for a motor vehicle having a forwardly driving engine; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and carrier member therefor, a sun gear member meshing with said planet gear, and an annulus gear member meshing with said planet gear; said annulus gear member being adapted to receive forward drive from the driving shaft and said carrier member being adapted to transmit forward drive to the driven shaft; overrunning control means for controlling the rotation of said sun gear member, said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct forward drive relationship between said annulus gear member and the driven shaft by causing all of the aforesaid members to rotate forwardly as a locked gear train; means for shifting one of said clutching structures relative to and toward the other for clutching therewith; a blocker member having a part thereof engageable with said shiftable clutching structure to prevent shift thereof to engage the other clutching structure when said clutching structures are rotating asynchronously; means for driving the blocker member for rotation with the carrier member, said means accommodating limited relative rotation between the blocker member and one of said clutching structures for blocking and unblocking positioning of the blocker member with respect to said shiftable clutching structure; means providing an operable connection between the blocker member and one of said clutching structures for moving the blocker member to one of its said positions with respect to said shiftable clutching structure; an overrunning clutch member carried by one of said shafts for rotation at the same speed therewith; and overrunning clutch rollers between said overrunning clutch member and said sun gear member operating to allow the last said shaft to rotate freely forwardly relative to said sun gear member during said reduction drive but limiting forward rotation of said sun gear member to the speed of this shaft when the driving shaft is allowed to coast.

24. In a power transmission for driving a motor vehicle having an engine; a driving shaft adapted to be driven by the engine; a driven shaft adapted to drive the vehicle; change speed mechanism including, means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; pressure fluid operated drive control means for effecting operation of one of said fast speed driving means; fluid pumping means for delivering pressure fluid to said fluid operated means; means for driving said fluid pumping means such that in stopping the vehicle with the engine running the pressure of the fluid will drop below that required to operate said fluid operated means; drive control means operable to effect operation of the other of said fast speed driving means, including, means preventing drive-establishing operation of this drive control means when the engine is driving the vehicle through said change speed mechanism but accommodating drive-establishing operation of this drive control means when the engine is allowed to coast; and drive control means for said slow speed driving means operating to effect this drive independently of said fluid pumping means and independently of operation of the second said drive control means for accelerating the vehicle from a position of rest, said slow speed drive control means operating to release the slow speed drive in response to operation of said pressure fluid operated means to accommodate a step-up in the drive through said change speed mechanism when said fluid pumping means operates to restore the pressure of the fluid during acceleration of the vehicle from rest as aforesaid.

25. In a power transmission according to claim 24, means operable under control of the driver at will for rendering one of the fast speed drive control means inoperative thereby effecting a step-down in the drive through the change speed mechanism.

26. In a power transmission for driving a motor vehicle having an engine; a driving shaft adapted to be driven by the engine; a driven shaft adapted to drive the vehicle; change speed mechanism including means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; pressure fluid operated drive control means for effecting operation of one of said fast speed driving means; fluid pumping means for delivering pressure fluid to said fluid operated means; means for driving said fluid pumping means such that in stopping the vehicle with the engine running the pressure of the fluid will drop below that required to operate said fluid operated means; the other of said fast speed driving means comprising a pair of positively engageable clutching structures adapted when clutched to effect operation of this fast speed drive, and means preventing clutching of said clutching structures when the engine is driving the vehicle through said change speed mechanism but accommodating clutching of said clutching structures when the engine is allowed to coast to synchronize the speeds of said clutching structures; and drive control means for said slow speed driving means operating to effect this drive independently of said fluid pumping means for accelerating the vehicle from a position of rest, said slow speed drive control means operating to release the slow speed drive in response to operation of said pressure fluid operated means to accommodate a step-up in the drive through said change speed mechanism when said fluid pumping means operates to restore the pressure of the fluid during acceleration of the vehicle from rest as aforesaid.

27. In a power transmission for driving a motor vehicle having an engine; a driving shaft adapted to be driven by the engine; a driven shaft adapted to drive the vehicle; change speed mechanism including, means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; drive control means operating, during operation of said slow speed driving means in driving the vehicle, to establish operation of one of said fast speed driving means in response to and during acceleration of the vehicle from rest, said drive control means operating to release this fast speed driving means in response to bringing the vehicle to rest; drive control means operable to establish operation of the other of said fast speed driving means, including, means limiting drive-establishing operation of this drive control means to reversal of the normal direction of torque flow through the change speed mechanism; and drive control means operable to establish operation of said slow speed driving means for accelerating the vehicle from rest, including, means operating automatically to release said slow speed driving means in response to operation of the first said drive control means.

28. In a power transmission for driving a motor vehicle having an engine; a driving shaft adapted to be driven by the engine; a driven shaft adapted to drive the vehicle; change speed mechanism including, means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; drive control means operating, during operation of said slow speed driving means in driving the vehicle, to establish operation of one of said fast speed driving means in response to and during acceleration of the vehicle from rest, said drive control means operating to release this fast speed driving means in response to bringing the vehicle to rest; drive control means for the other of said fast speed driving means, including, positively engageable clutching structures adapted when clutched to effect operation of this fast speed drive, and means preventing clutching of said clutching structures when the engine is driving the vehicle through said change speed mechanism but accommodating clutching of said clutching structures when the engine is allowed to coast to synchronize the speeds of said clutching structures; and drive control means operable to establish operation of said slow speed driving means for accelerating the vehicle from rest, including, means operating automatically to release said slow speed driving means in response to operation of the first said drive control means.

29. In a power transmission for driving a motor vehicle having an engine; a driving shaft adapted to be driven by the engine; a driven shaft adapted to drive the vehicle; change speed mechanism including, means for driving the driven shaft from the driving shaft at a relatively slow speed, means for driving the driven shaft from the driving shaft at an intermediate speed which is relatively faster than that provided by said slow speed driving means, and means for driving the driven shaft from the driving shaft at a fast speed which is relatively faster than that provided by said slow speed driving means and by the first said fast speed driving means; pressure fluid operated drive control means operating, during operation of said slow speed driving means in driving the vehicle, to establish operation of one of said fast speed driving means in response to and during acceleration of the vehicle from rest, said drive control means operating to release this fast speed driving means in response to bringing the vehicle to rest; pumping means for delivering pressure fluid to said pressure fluid operated drive control means; drive control means operable independently of said pumping means to establish operation of the other of said fast speed driving means, including, means limiting drive-establishing operation of this drive control means to reversal of the normal direction of torque flow through the change speed mechanism; and drive control means operable independently of said pumping means to establish operation of said slow speed driving means for accelerating the vehicle from rest, including, means operating automatically to release said slow speed driving means in response to operation of said pressure fluid operated drive control means.

30. In a power transmission for driving a motor vehicle having an engine; a pair of series-arranged change speed mechanisms adapted to be driven by said engine, each of said mechanisms having an input member and an output member, the input and output members of the first of said series-arranged mechanisms being adapted respectively to receive drive from said engine and to transmit drive from this mechanism to the input member of the other of said mechanisms, the output member of the last said mechanism being adapted to drive the vehicle; one of said mechanisms comprising relatively slow speed driving means, including an overrunning drive operably associated therewith, for driving the output member thereof from the input member thereof, said device automatically operating to allow the output member thereof to overrun the input member thereof to accommodate coast down of the input member thereof and release of said relatively slow speed driving means, this mechanism also comprising relatively fast speed driving means including positively engageable clutching structures respectively drivingly connected with the input and output members thereof for rotation at relatively different speeds during operation of said slow speed driving means, and means limiting clutching of said clutching structures to coast down of the input member thereof to synchronize the speeds of said clutching structures; the other of said mechanisms comprising, relatively slow speed driving means for driving the output member thereof from the input member thereof, relatively fast speed driving means including pressure fluid operated drive control means adapted when operated to establish operation of this relatively fast speed driving means for causing a step-up in the drive from the input member thereof to the output member thereof, means operating in response to and during acceleration of the vehicle from rest for delivering pressure fluid to said pressure fluid operated means to cause drive-establishing operation thereof, and means for rendering said pressure fluid operated drive control means inoperative thereby to release this relatively fast speed driving means in response to bringing the vehicle to rest.

31. In a power transmission for driving a motor vehicle having an engine; a pair of series-arranged change speed mechanisms adapted to be driven by said engine, each of said mechanisms having an input member and an output member, the input and output members of the first of said series-arranged mechanisms being adapted respectively to receive drive from said engine and to transmit drive from this mechanism to the input member of the other of said mechanisms, the output member of the last said mechanism being adapted to drive the vehicle; one of said change speed mechanisms comprising means for driving the output member thereof from the input member thereof at a relatively slow speed driving ratio, and means for automatically stepping-up the drive to drive the output member thereof from the input member thereof at a relatively fast speed driving ratio in response to coast of the input member; the other of said change speed mechanisms comprising means for driving the output member thereof from the input member thereof at a relatively slow speed driving ratio, means for automatically stepping-up the drive to drive the output member thereof from the input member thereof at a relatively fast speed driving ratio in response to and during acceleration of the vehicle from rest in both of said slow speed driving ratios, and speed responsive control means operably associated with the last said step-up drive means for limiting step-up operation thereof to the attainment of at least a predetermined speed of one of the members of this last mentioned change speed mechanism.

32. In a power transmission for driving a motor vehicle having an engine; a pair of series-arranged change speed mechanisms adapted to be driven by said engine, each of said mechanisms having an input member and an output member, the input and output members of the first of said series-arranged mechanisms being adapted respectively to receive drive from said engine and to transmit drive from this mechanism to the input member of the other of said mechanisms, the output member of the last said mechanism being adapted to drive the vehicle; one of said change speed mechanisms comprising means for driving the output member thereof from the input member thereof at a relatively slow speed driving ratio, and means limited in the operation thereof to drive at least one of the members thereof at or above a predetermined speed for automatically stepping-up the drive to drive the output member thereof from the input member thereof at a relatively fast speed driving ratio in response to coast of the input member; the other of said change speed mechanisms comprising means for driving the output member thereof from the input member thereof at a relatively slow speed driving ratio, and means controlled by predetermined rotation of one of the members thereof for automatically stepping-up the drive to drive the output member thereof from the input member thereof at a relatively fast speed driving ratio during operation of the last said relatively slow speed drive.

33. In a power transmission for driving the rear ground wheels of a motor vehicle having an engine disposed forwardly of the vehicle; a driving shaft extending rearwardly from the engine for receiving forward drive therefrom; a driven shaft coaxial with the driving shaft and extending rearwardly therefrom for transmitting drive to said ground wheels; a hub structure fixed to the driving shaft and having an annulus gear projecting forwardly therefrom; planet pinions meshed with the annulus gear; a carrier for said pinions disposed forwardly of said pinions and having a rearwardly extending cylindrical driving portion concentric with the axis of the driving shaft and surrounding said annulus gear and said pinions; means for drivingly connecting said cylindrical driving portion with the driven shaft; a sun gear loosely surrounding the driving shaft and meshed with said pinions, said sun gear having a forwardly extending control portion; a reaction-taking member surrounding said control portion; overrunning control means operable between said control portion and said reaction-taking member to prevent backward rotation of said sun gear and to allow forward rotation of said sun gear; and overrunning clutch means operable intermediate the driving shaft and the control portion of the sun gear to prevent forward rotation of the sun gear at a speed faster than that of the driving shaft and to allow the driving shaft to rotate forwardly at a speed faster than that of said sun gear.

34. In a drive for a motor vehicle having an engine and a driven shaft adapted to transmit drive from the engine to the vehicle; change speed mechanism comprising, means for driving the driven shaft from the engine at a relatively slow speed, means for driving the driven shaft from the engine at an intermediate speed which is relatively faster than that provided by said slow speed driving means, and means for driving the driven shaft from the engine at a fast speed which is relatively faster than that provided by said relatively slow drive operating to establish said slow said fast speed driving means; a fluid coupling cooperably associated with the engine and change speed mechanism; an element mounted for manipulation by the vehicle driver to a drive-controlling position accommodating operation of each of the aforesaid driving means; control means for said relatively slow drive operating when the vehicle is at rest and when said driver-manipulated element is positioned at said drive-controlling position to provide drive relationship from the engine to the driven shaft in said slow speed such that the vehicle may be accelerated from a position of rest; said fluid coupling acting to provide fluid slip between the engine and driven shaft such that with the vehicle at rest and with said driver-manipuated element positioned at said drive-controlling position the engine may idle; control means operating, during operation of said slow speed driving means in driving the vehicle and when said driver-manipulated element is positioned at said drive-controlling position, to establish operation of one of said fast speed driving means in response to and during acceleration of the vehicle from rest and to release this fast speed driving means in response to bringing the vehicle to rest; control means operating when said driver-manipulated element is positioned at said drive-controlling position to establish operation of the other of said fast speed driving means and to release this driving means in reponse to bringing the vehicle to rest, including, means invariably limiting drive-establishing operation of this drive control means, in effecting drive step-up, until said reversal of the normal direction of torque flow from the engine through the change speed mechanism takes place; said control means for said relatively slow drive operating to establish said slow drive in bringing the vehicle to rest from a condition of drive in either of said faster drives such that said driver-manipulated element may be left at said drive-controlling position and the vehicle operated in successive cycles of, firstly, initially accelerating the vehicle from rest in said slow drive with automatic progressive step-up in the drive speed ratio, one step-up occurring during vehicle drive and the other step-up occurring only during vehicle coast and, secondly, bringing the vehicle to rest with the engine idling by accommodation of the fluid coupling.

35. In a drive for a motor vehicle having an engine and a driven shaft adapted to transmit drive from the engine to the vehicle; change speed mechanism comprising, means for driving the driven shaft from the engine at a relatively slow speed, means for driving the driven shaft from the engine at an intermediate speed which is relatively faster than that provided by said slow speed driving means, and means for driving the driven shaft from the engine at a fast speed which is relatively faster than that provided by said slow speed driving means and by the first said fast speed driving means; a fluid coupling cooperably associated with the engine and change speed mechanism; an element mounted for manipulation by the vehicle driver to a drive-controlling position accommodating operation of each of the aforesaid driving means; said fluid coupling acting to provide fluid slip between the engine and driven shaft such that with the vehicle at rest and with said driver-manipulated element positioned at said drive-controlling position the engine may idle; pressure fluid control means operating during vehicle drive in said relatively slow speed and when said driver-manipulated element is positioned at said drive-controlling position to establish operation of one of said fast speed driving means in response to and during acceleration of the vehicle from rest and to release this fast speed driving means in response to bringing the vehicle to rest; said pressure fluid means including a source of fluid and a pump adapted to be driven independently of the engine at a constant speed ratio with respect to the speed of travel of the vehicle; control means for said relatively slow drive operating independently of said pump when the vehicle is at rest and when said driver-manipulated element is positioned at said drive-controlling position to provide drive relationship from the engine to the driven shaft in said slow speed such that the vehicle may be accelerated from a position of rest; control means operating when said driver-manipulated element is positioned at said drive-controlling position to establish operation of the other of said fast speed driving means and to release this driving means in response to bringing the vehicle to rest, including, means limiting drive-establishing operation of this drive control means to reversal of the normal direction of torque flow from the engine through the change speed mechanism; said control means for said relatively slow drive operating to establish said slow drive in bringing the vehicle to rest from a condition of drive in either of said faster drives such that said driver-manipulated element may be left at said drive-controlling position and the vehicle operated in successive cycles of, firstly, initially accelerating the vehicle from rest in said slow drive with automatic progressive step-up in the drive speed ratio, one step-up occurring during vehicle drive and the other step-up occurring during vehicle coast and, secondly, bringing the vehicle to rest with the engine idling by accommodation of the fluid coupling.

36. In a drive for a motor vehicle having an engine; transmission mechanism operable to provide a plurality of drives of differing speed ratio from the engine to the vehicle, one of said drives being relatively slow with respect to a pair of said drives which are relatively fast; said engine being adapted for control by the vehicle either to compel normal torque flow through said transmission mechanism for driving the vehicle or to accommodate reversal of said normal torque flow incident to vehicle coast; a fluid coupling cooperably associated with said engine and said transmission mechanism for transmitting drive therebetween such that said fluid coupling provides a slip in the drive facilitating acceleration of the vehicle from rest by allowing the engine to race ahead of the vehicle and operate at a relatively favorable torque output; the faster of said pair of relatively fast drives constituting the normal speed ratio drive of the vehicle for both relatively slow city driving and relatively fast country driving and comprising means so constructed and arranged as to always limit drive-establishing operation of this faster drive, in effecting drive step-up, until said reversal of torque flow through said transmission takes place; control means for said transmission mechanism adapted to be set by the vehicle driver to accommodate operation of said relatively slow drive and said pair of relatively fast drives; and means operable in response to accelerating the vehicle from rest in said relatively slow drive followed by said reversal of said torque flow for so controlling operation of said transmission mechanism that, with said driver-set control means set to accommodate operation of the faster of said pair of relatively fast drives, the speed ratio drive through said transmission mechanism will step-up to the slower of said pair of relatively fast drives during continued vehicle acceleration accompanied by said normal torque flow through said transmission mechanism, followed by step-up to the faster of said pair of relatively fast drives delayed at the will of the vehicle driver until said reversal of the torque flow through said transmission mechanism takes place.

CARL A. NERACHER.
WILLIAM T. DUNN.